Nov. 12, 1968 J. W. DICKEY 3,410,118
APPARATUS FOR DRY CLEANING
Filed Feb. 1, 1966 13 Sheets-Sheet 1
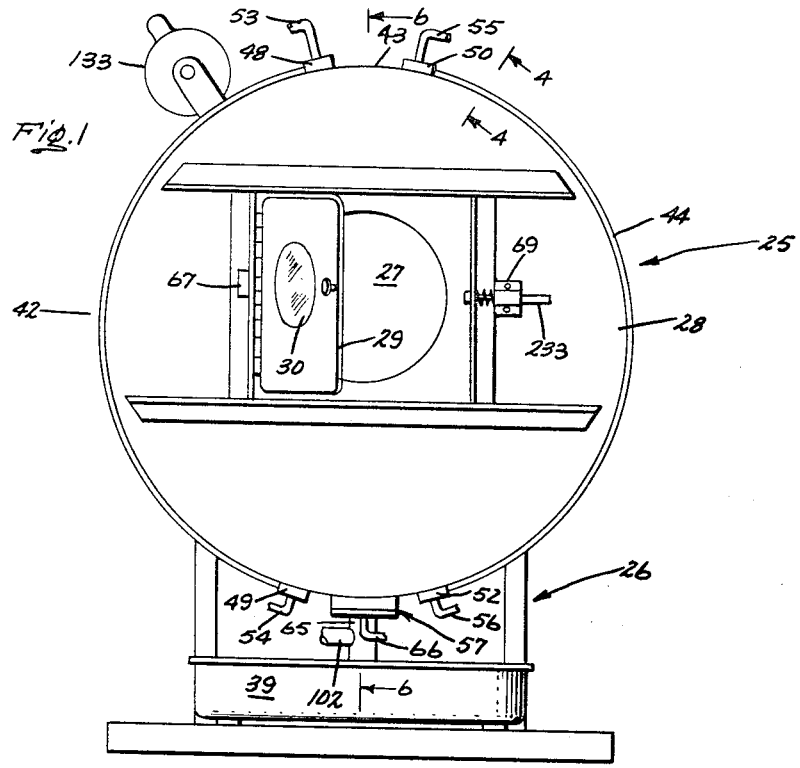
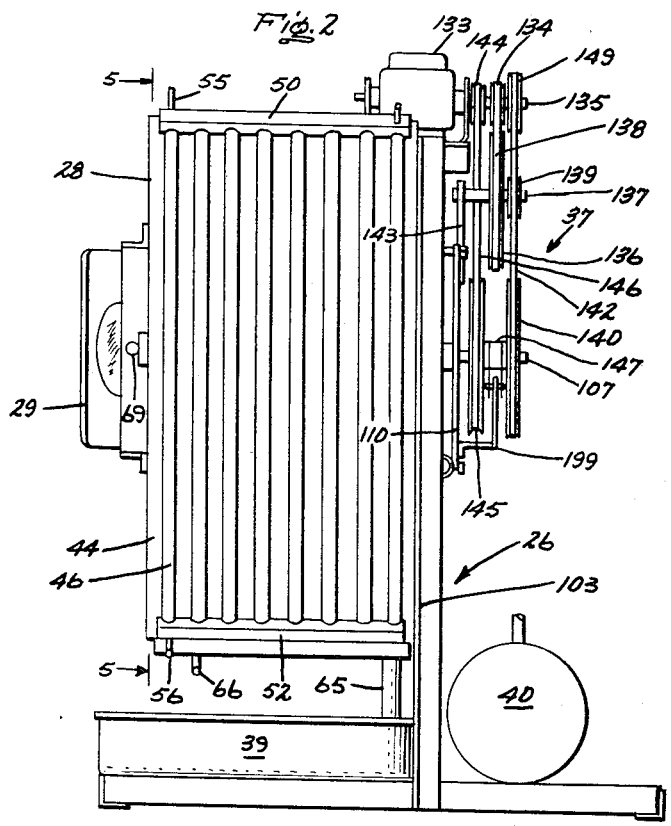
Inventor:
John W. Dickey,
by Nood, Smith Orish
Attorneys.

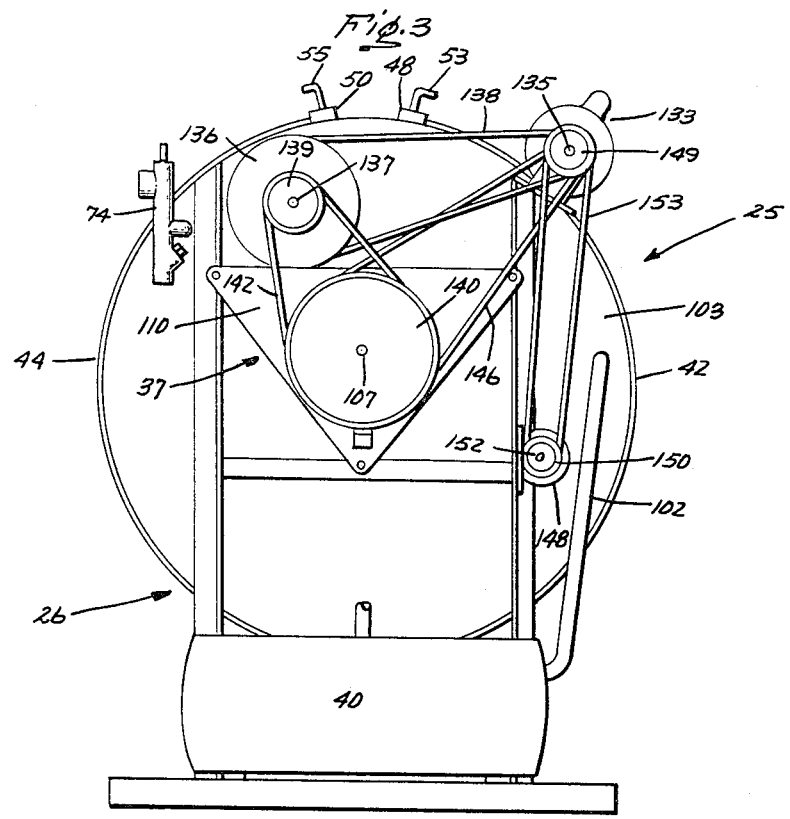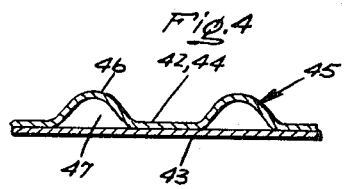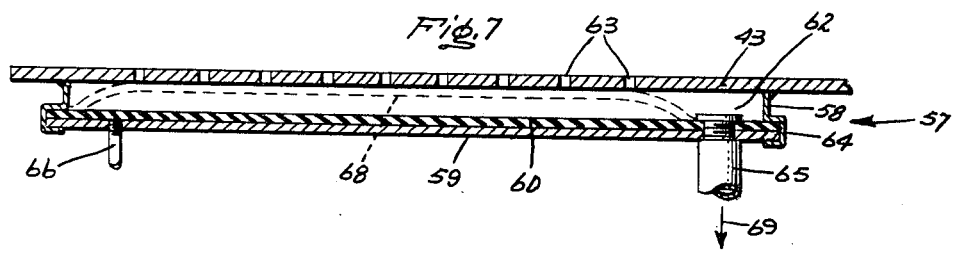

Nov. 12, 1968     J. W. DICKEY     3,410,118
APPARATUS FOR DRY CLEANING
Filed Feb. 1, 1966     13 Sheets-Sheet 3
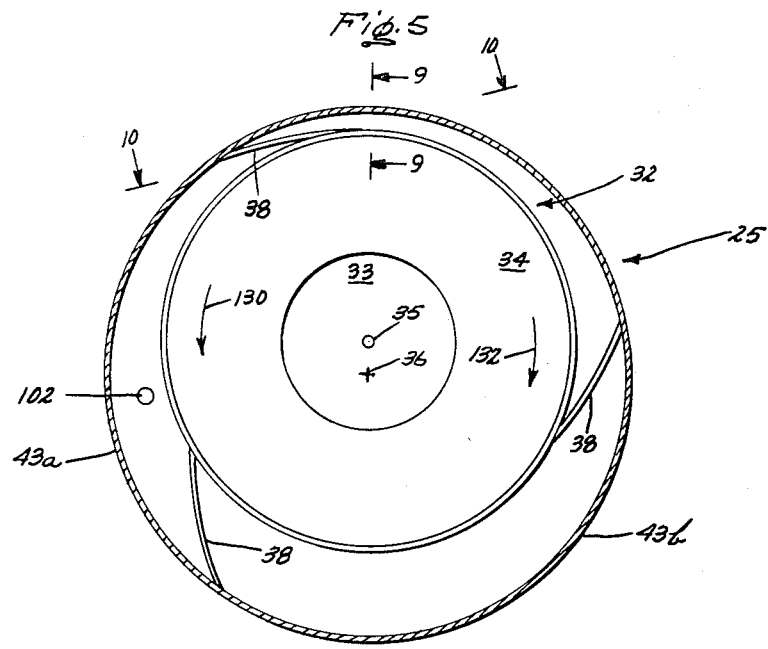
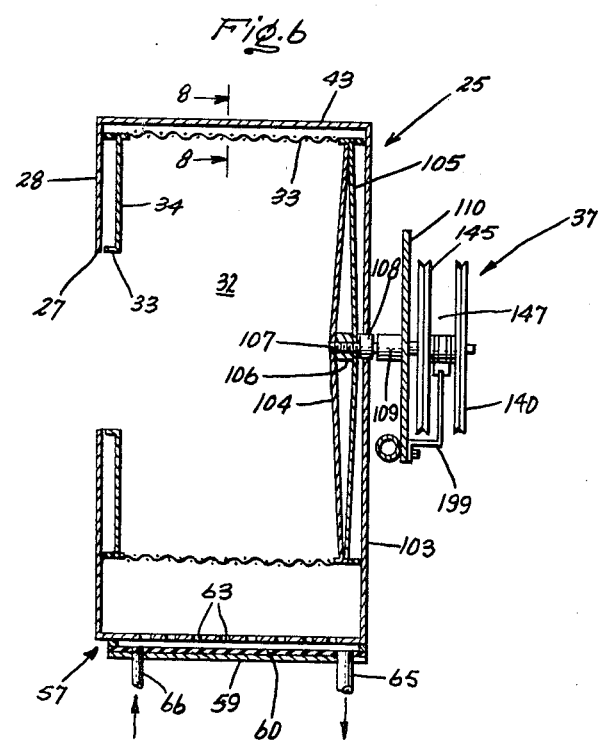
Inventor:
John W. Dickey,
by Wood, Nest & Dale
Attorneys.

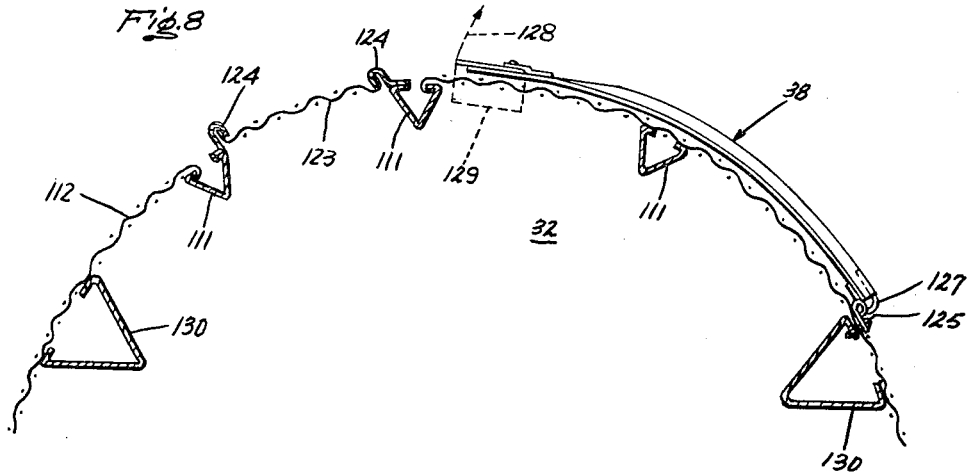
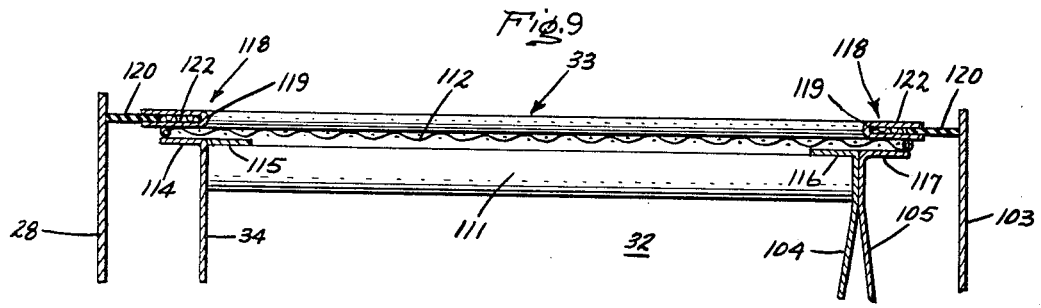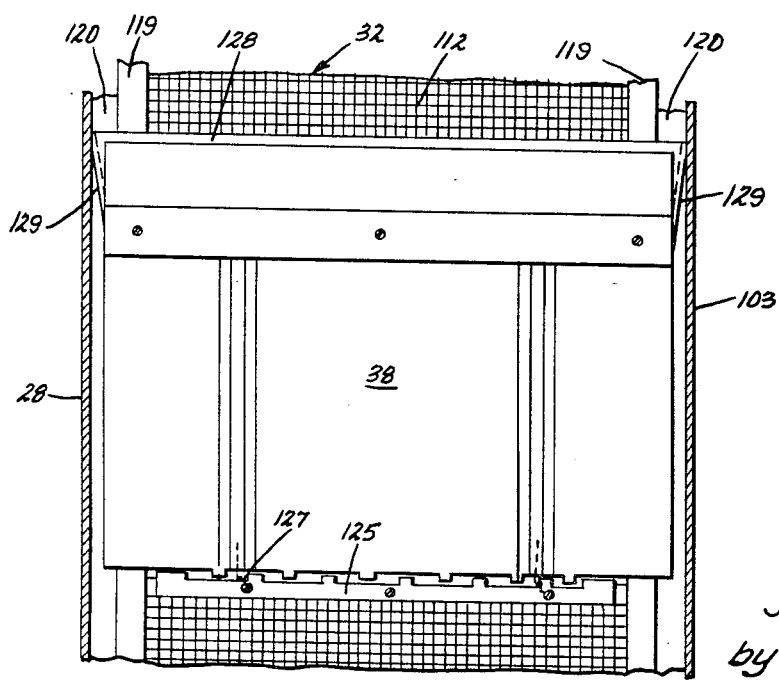

Nov. 12, 1968 J. W. DICKEY 3,410,118
APPARATUS FOR DRY CLEANING
Filed Feb. 1, 1966 13 Sheets-Sheet 5
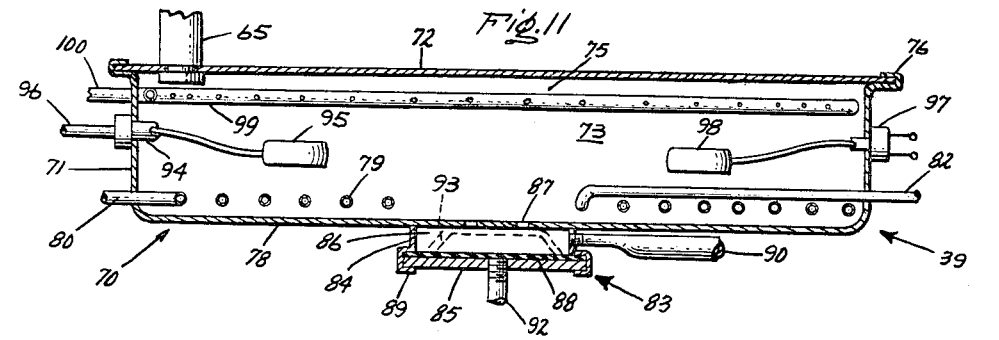
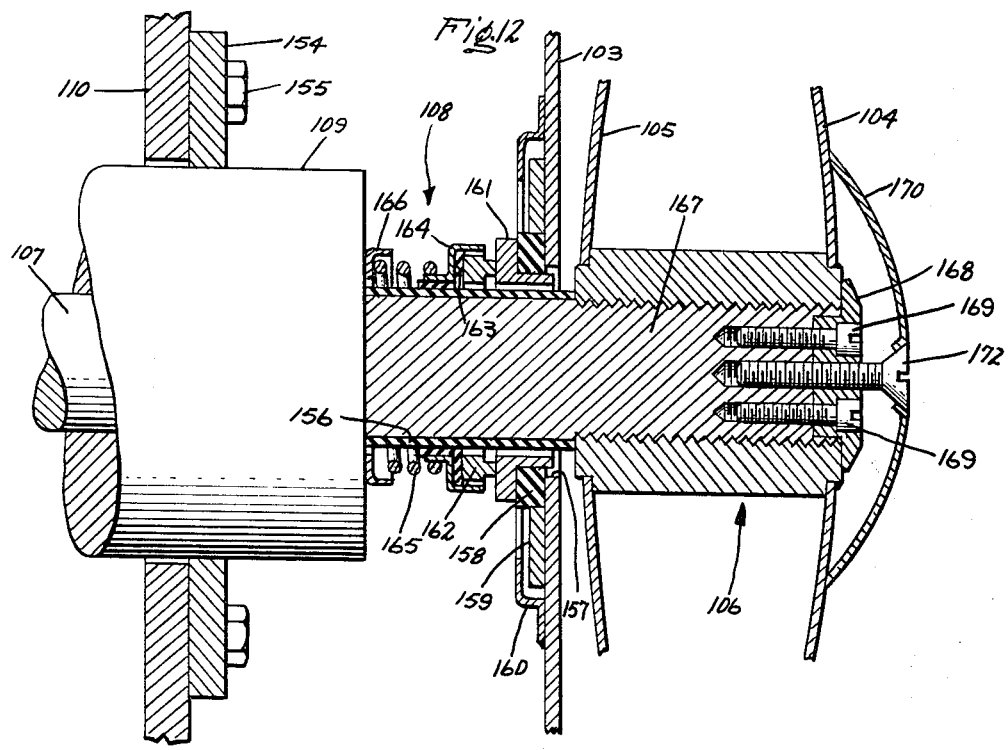
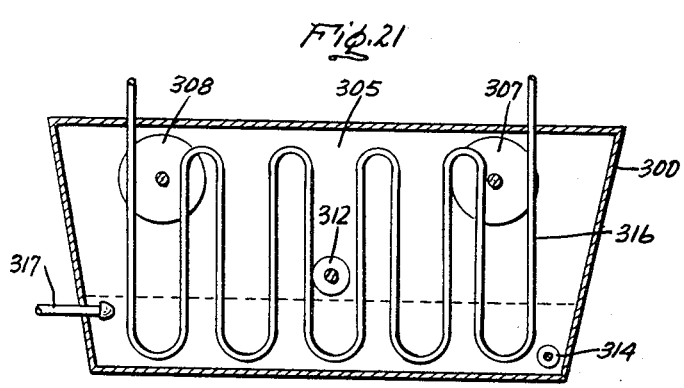
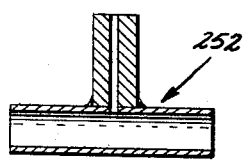
Inventor:
John W. Dickey,
by Hood, Gust & Irish
Attorneys.

Nov. 12, 1968     J. W. DICKEY     3,410,118
APPARATUS FOR DRY CLEANING
Filed Feb. 1, 1966     13 Sheets-Sheet 6
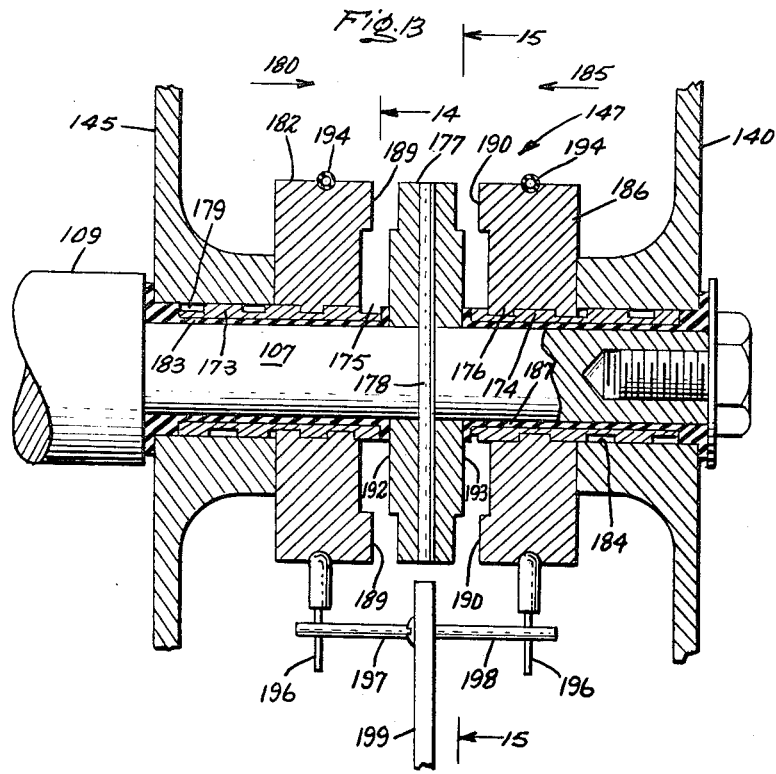
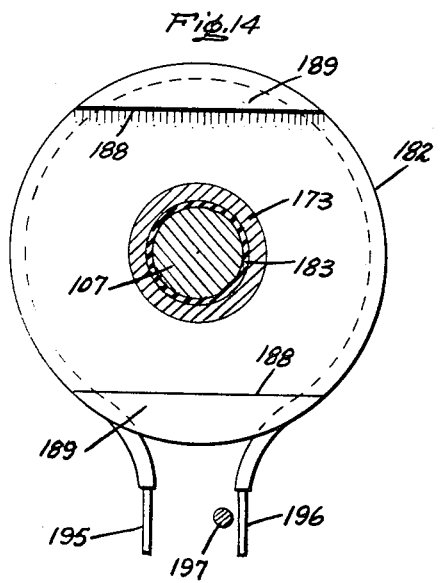
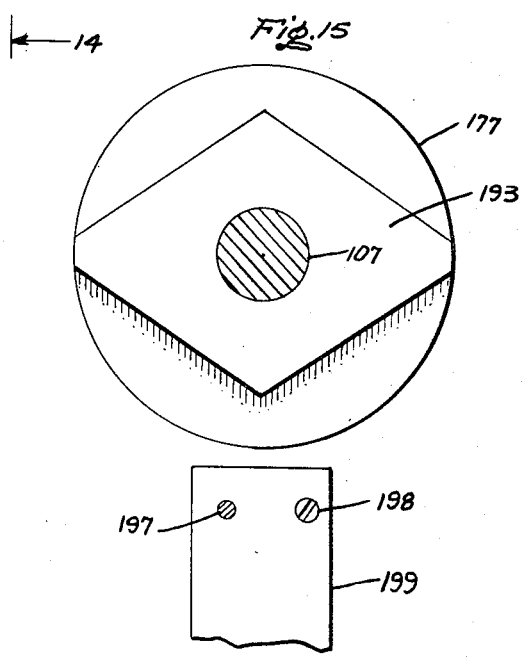
Inventor:
John W. Dickey,
by Hood, Gust & Irish
Attorneys

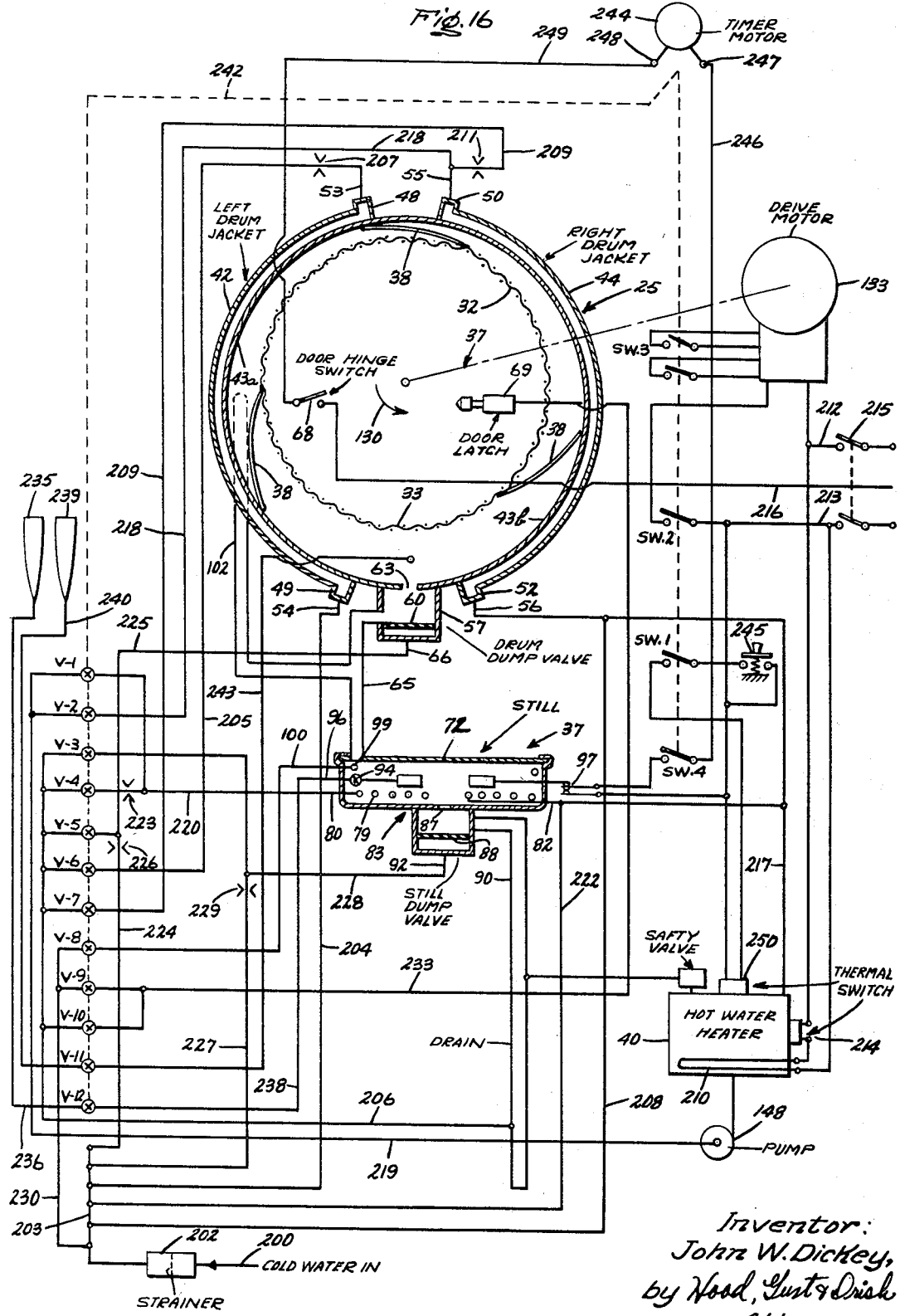

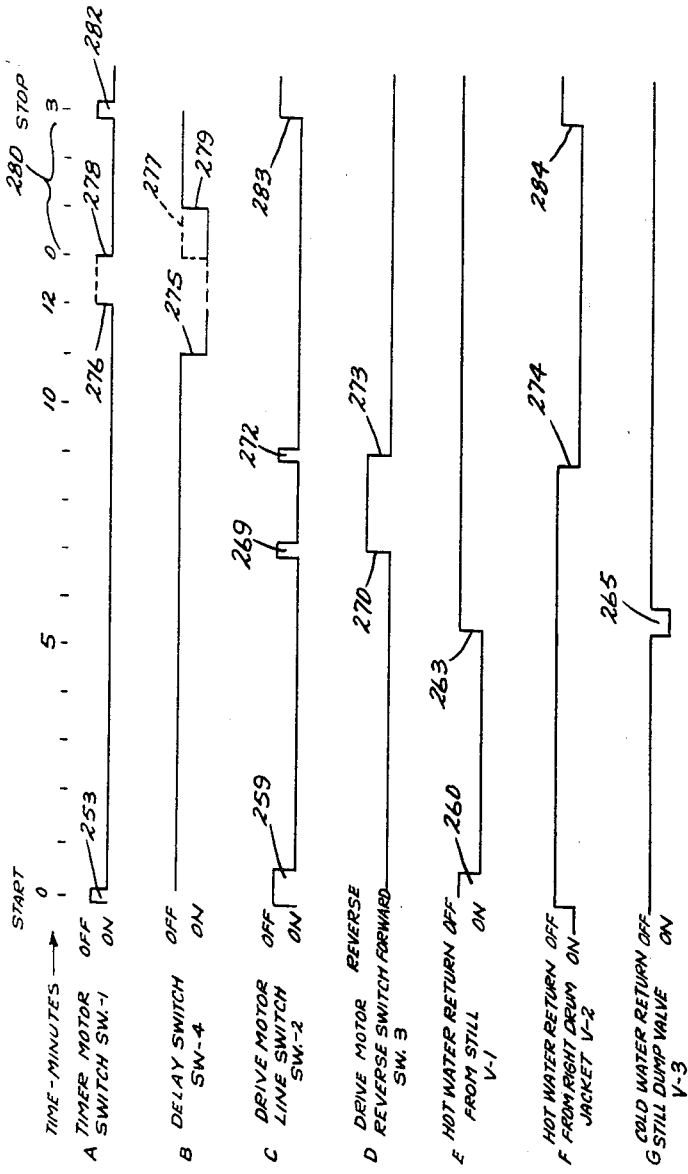

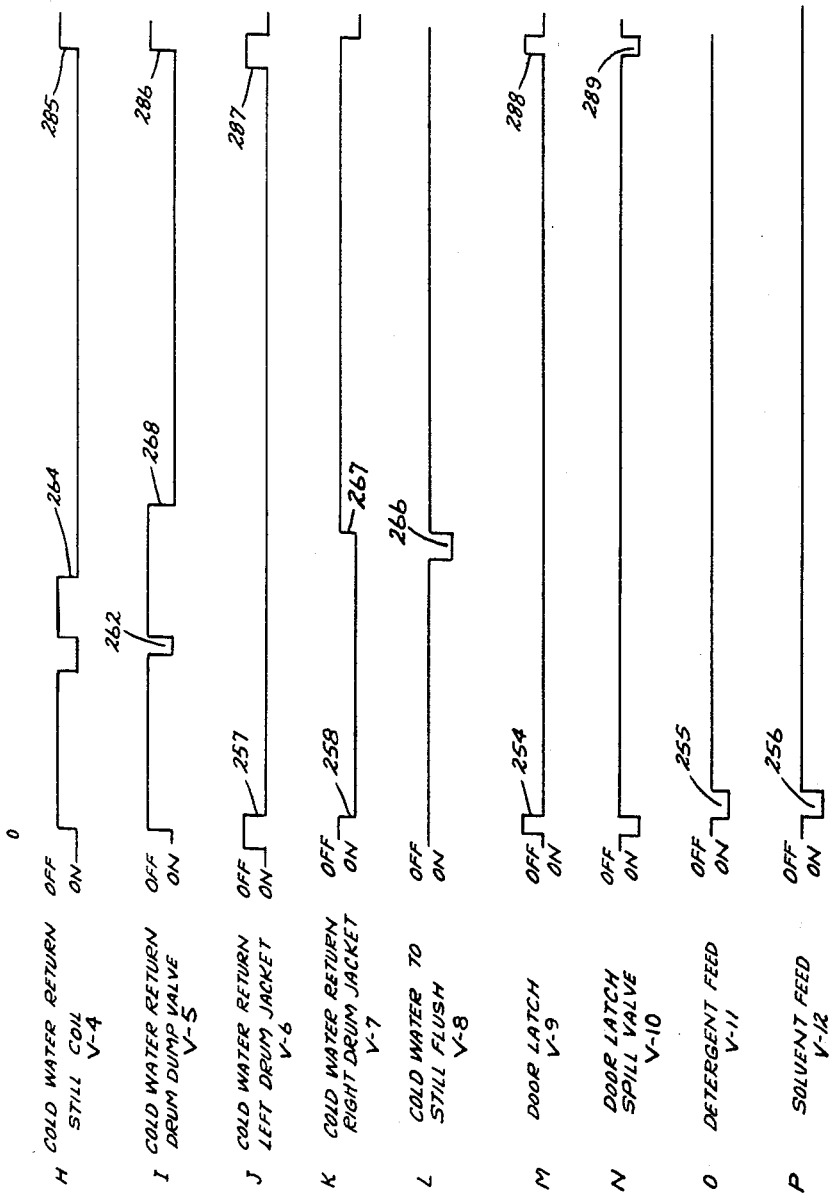

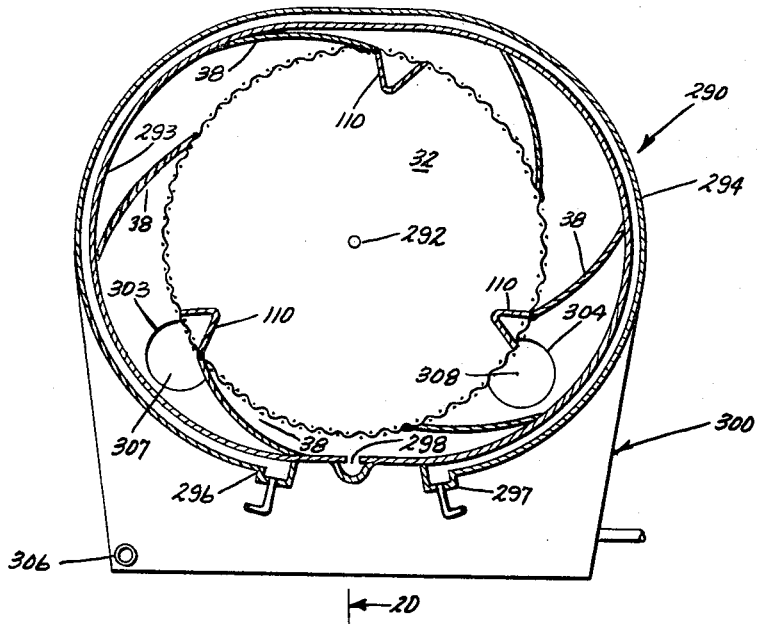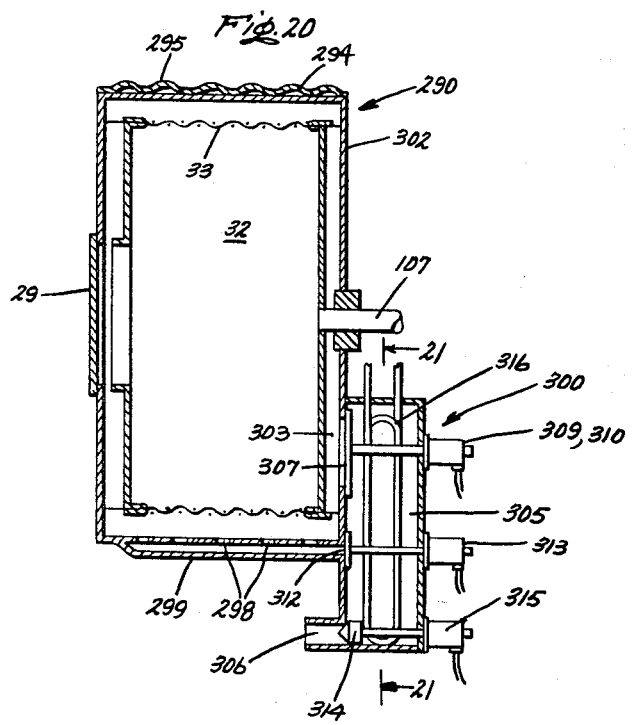

Nov. 12, 1968  J. W. DICKEY  3,410,118
APPARATUS FOR DRY CLEANING
Filed Feb. 1, 1966  13 Sheets-Sheet 11
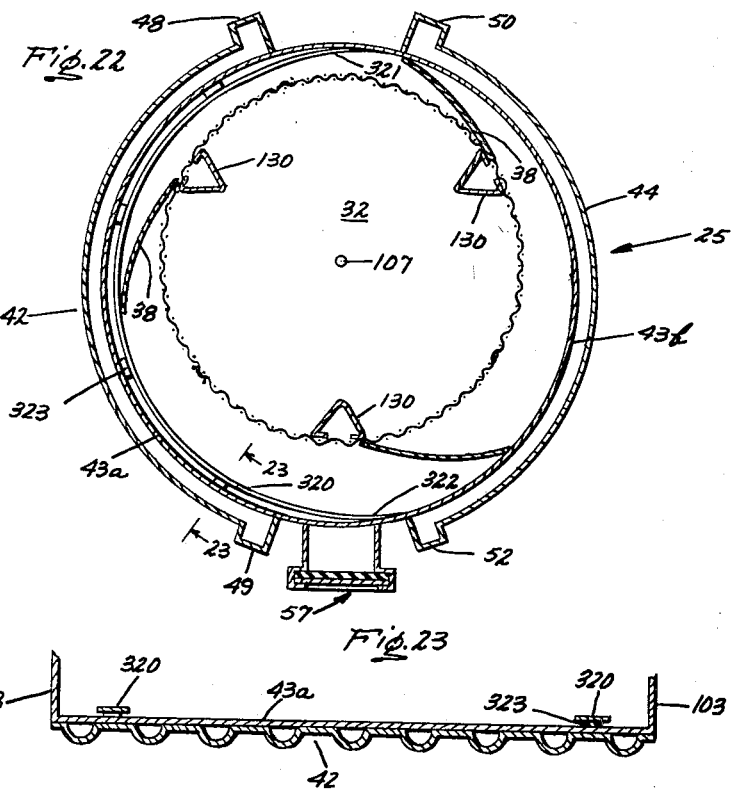
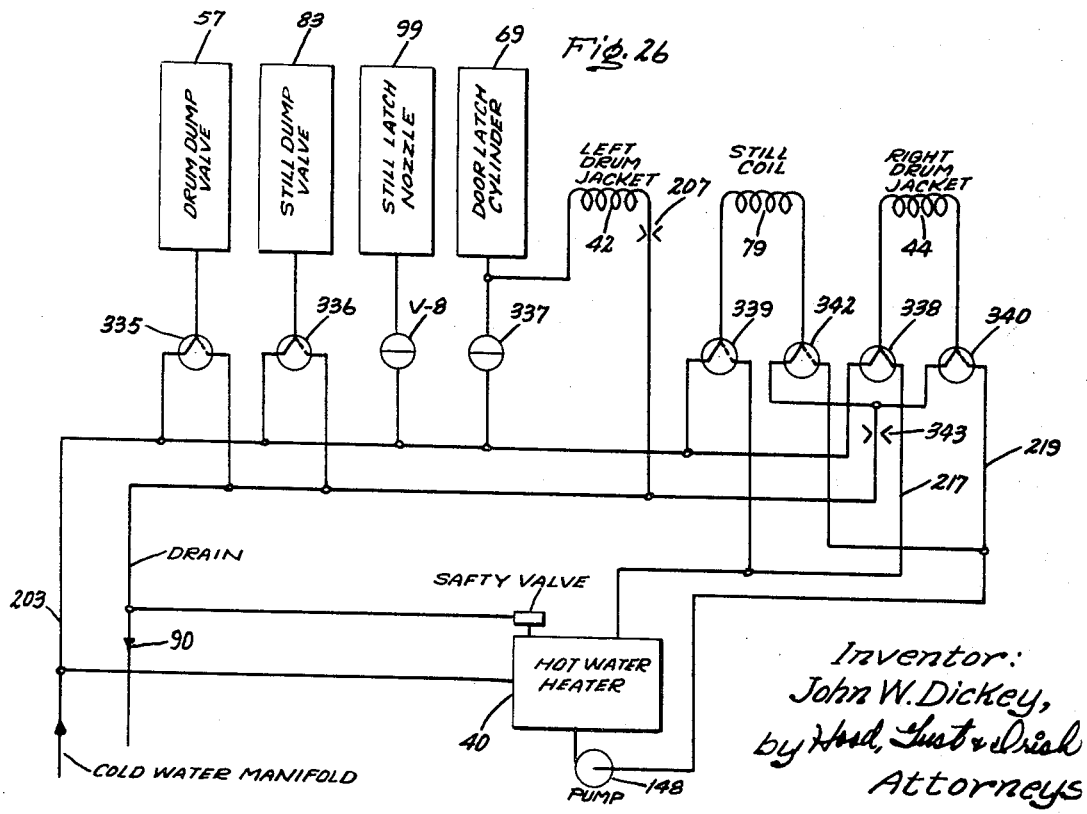
Inventor:
John W. Dickey,
by Hood, Gust & Diehl
Attorneys

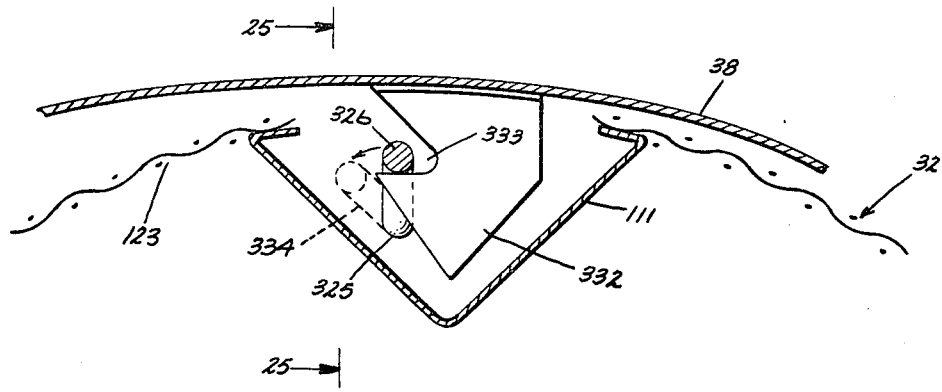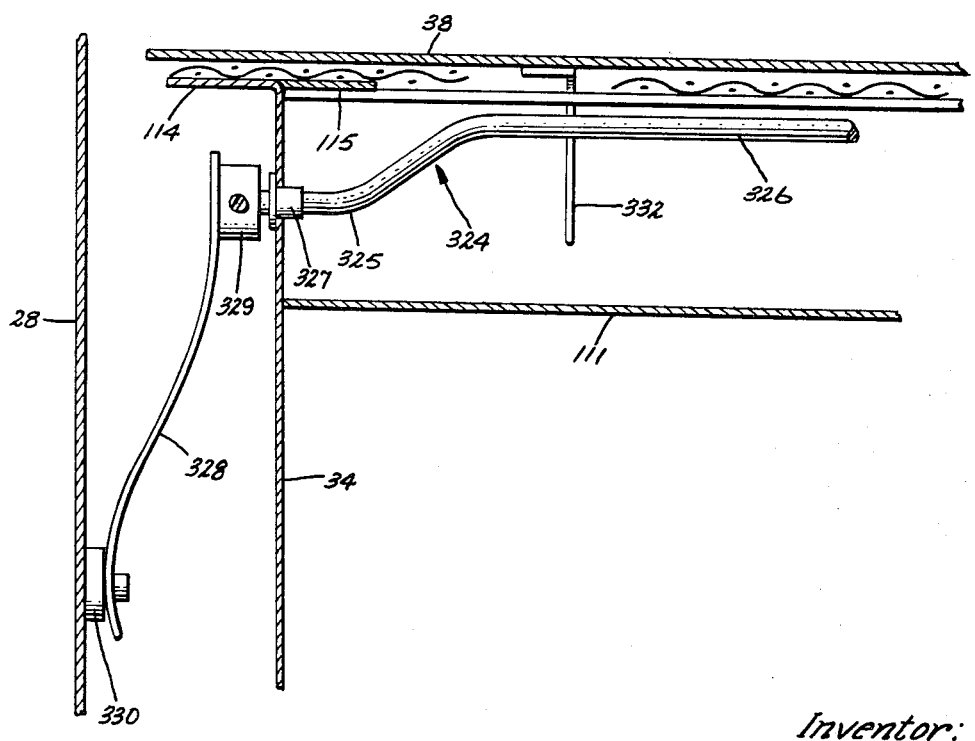

Nov. 12, 1968  J. W. DICKEY  3,410,118
APPARATUS FOR DRY CLEANING
Filed Feb. 1, 1966  13 Sheets-Sheet 13
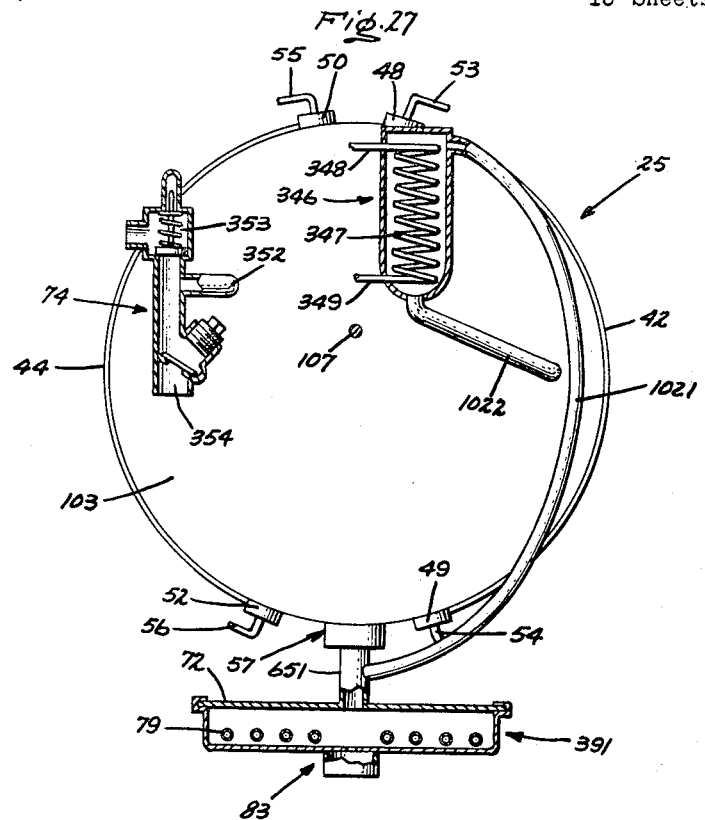
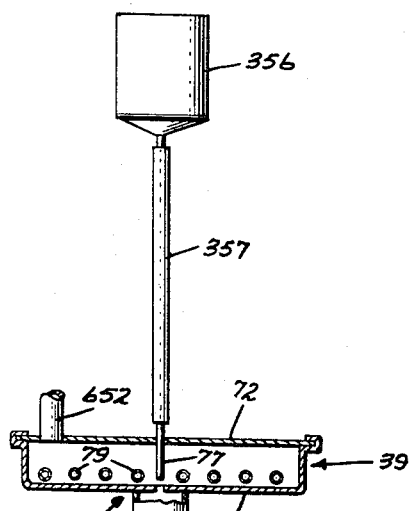
Inventor
John W. Dickey,
by Hood, Gust & Irish
Attorneys.

3,410,118
APPARATUS FOR DRY CLEANING
John W. Dickey, Esmont, Va., assignor to Forenta Forschungs und Entwicklungs Aktiengesellschaft
Filed Feb. 1, 1966, Ser. No. 524,329
34 Claims. (Cl. 68—12)

ABSTRACT OF THE DISCLOSURE

Dry cleaning apparatus, including a housing having an access opening with means for selectively closing and sealing the opening. An apertured basket is rotatably mounted in the housing and has an access opening so that the materials to be cleaned may be placed in the basked through the housing and basket access openings. A solvent still is provided including means for selectively heating the solvent thereby to vaporize the same. Passage means communicates between the still and the housing for transferring solvent to the housing, and means is provided for condensing the solvent. Means is provided for selectively heating the air in the housing and pumping means is provided carried by the basket in the housing and actuated thereby at times for circulating condensed solvent through the materials in the basket to wash the same and at other times for circulating heated air through the materials to vaporize the condensed solvent therein to dry the materials.

---

This invention relates generally to apparatus for dry cleaning, and more particularly to automatic closed cycle dry cleaning apparatus.

Fabrics are conventionally "dry cleaned" by applying a solvent thereto which dissolves and removes grease and other soiling agents. In conventional dry cleaning methods and apparatus the materials being cleaned are tumbled in a bath of solvent, the dirty solvent subsequently being drained from the apparatus and cleaned by distillation. The vaporized solvent is then conventionally condensed and the solvent reintroduced into the apparatus in liquid form. Such prior conventional dry cleaning methods and apparatus employ a substantial quantity of solvent, dry cleaning solvents being costly, and thus necessitate employment of storage, distillation and condensation apparatus of appreciable size and capacity. It is therefore desirable to provide a dry cleaning method and apparatus of the closed cycle type which employs substantially less solvent than prior methods and apparatus.

An object of the invention is to provide an improved closed cycle dry cleaning apparatus.

A further object of the invention is to provide an improved automatic closed cycle dry cleaning apparatus employing substantially less solvent than prior apparatus.

The apparatus of the invention, in its broader aspects, comprises a housing having an access opening therein with means for selectively closing and sealing the opening. An apertured basket is rotatably mounted within the housing and has an access opening therein so that the materials to be cleaned may be placed in the basket through the housing and basket access openings. A solvent still is provided having means for selectively heating the solvent therein thereby to vaporize the same. Passage means communicates between the still and the housing for transferring solvent thereto and means is provided for condensing the solvent. Means is provided for selectively heating the air in the housing and pumping means is provided carried by the basket in the housing and actuated thereby for at times circulating condensed solvent through the materials in the basket to wash the same and at other times circulating heated air through the materials thereby to vaporize the condensed solvent therein to dry the same.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a front view of an embodiment of the apparatus of the invention for high pressure operation;

FIG. 2 is a side view of the apparatus of FIG. 1;

FIG. 3 is a rear view of the apparatus of FIG. 1;

FIG. 4 is a fragmentary, cross-sectional view taken along the line 4—4 of FIG. 1;

FIG. 5 is a cross-sectional view taken along the line 5—5 of FIG. 2;

FIG. 6 is a cross-sectional view taken along the line 6—6 of FIG. 1;

FIG. 7 is a fragmentary, enlarged, cross-sectional view showing the drum dump valve in greater detail and taken along the same section line as FIG. 6;

FIG. 8 is a fragmentary, cross-sectional view taken along the line 8—8 of FIG. 6;

FIG. 9 is a fragmentary, cross-sectional view taken along the line 9—9 of FIG. 5;

FIG. 10 is a fragmentary, cross-sectional view taken along the line 10—10 of FIG. 5;

FIG. 11 is a cross-sectional view of the still of the embodiment of FIG. 1;

FIG. 12 is a fragmentary, cross-sectional view showing the basket shaft seal of the embodiment of FIG. 1;

FIG. 13 is a fragmentary, cross-sectional view showing the basket drive of the embodiment of FIG. 1;

FIG. 14 is a cross-sectional view taken along the line 14—14 of FIG. 13;

FIG. 15 is a cross-sectional view taken along the line 15—15 of FIG. 13;

FIG. 16 is a schematic diagram showing the plumbing, electrical and programming connections for the embodiment of FIG. 1;

FIG. 17 is a programming diagram for the embodiment of FIG. 1;

FIG. 18 is a fragmentary view showing a restrictor T used in the embodiment of FIG. 1;

FIG. 19 is a cross-sectional view showing another embodiment of the invention;

FIG. 20 is a cross-sectional view taken along the line 20—20 of FIG. 19;

FIG. 21 is a cross-sectional view taken along the line 21—21 of FIG. 20;

FIG. 22 is a fragmentary, cross-sectional view showing the preferred form of the embodiment of FIGS. 1–17;

FIG. 23 is a fragmentary, cross-sectional view taken along the line 23—23 of FIG. 22;

FIG. 24 is another fragmentary, cross-sectional view showing the preferred form of the embodiment of FIGS. 1–17;

FIG. 25 is a fragmentary, cross-sectional view taken along the line 25—25 of FIG. 24;

FIG. 26 is a fragmentary, schematic diagram showing the preferred form of plumbing and valving connections for the embodiment of FIGS. 1–17;

FIG. 27 is a fragmentary, rear view, partly in cross-section, illustrating modification of the embodiments of FIGS. 1–17 to provide a low pressure embodiment of the invention;

FIG. 28 is a fragmentary view, partly in cross-section, showing modification of the still to incorporate a fluid rejection reservoir.

Referring now to FIGS. 1 through 17 of the drawings, the high pressure embodiment of the apparatus of the invention shown which is intended primarily for commercial application comprises a cylindrical drum 25 supported on a frame 26 and having an access opening 27 in its front wall 28, access opening 27 being sealingly closed by door 29 which may have a viewing window 30 therein.

A cylindrical basket 32 having a perforated side wall 33 is rotatably mounted within drum 25 and has access opening 33 formed in its front wall 34, access openings 27, 33 being in alignment for loading materials to be cleaned into the interior of the basket 32. Basket 32 is rotatably mounted in drum 25 for rotation about its axis 35, axis 35 of basket 32 being parallel but eccentric with respect to axis 36 of drum 25 for a purpose to be hereinafter more fully described. Basket 32 is selectively rotated in opposite directions by a drive assembly 37 mounted on frame 26 at the rear of drum 25. Basket 32 has a plurality of pumping blades 38, to be hereinafter more fully described, mounted on its side wall 33.

A solvent still 39 is positioned under drum 25 and is connected thereto as will be hereinafter more fully described. A hot water heating tank 40 is mounted on frame 26 at the rear of drum 25 and is connected to the other components of the apparatus as will be hereinafter described.

A cooling water jacket is mounted on the outer surface of one side of the side wall 43 of drum 25 and a cooling and heating water jacket 44 is mounted on the outer surface of the other side of the side wall 43, the jackets 42 and 44 collectively embracing a substantial portion of the side wall 43 as best seen in FIG. 1.

Jackets 42, 44 are respectively formed by plates 45 respectively secured to the outer surface of side wall 43, as by welding, and having circumferentially extending ribs 46 which define water passages 47 with the side wall 43, as best seen in FIG. 4. Transversely extending manifolds 48 and 49 respectively connect the extremities of the passages 47 of the jacket 42 and transversely extending manifolds 50 and 52 respectively connect the passages 47 of the jacket 44. Couplings 53, 54 are respectively connected to the manifolds 48, 49 for circulating cold water through the passages 47 of the jacket 42 and couplings 55, 56 are respectively connected to the manifolds 50, 52 for circulating cold or hot water through the passages 47 of the jacket 44.

A drain box and dump valve assembly 57 is secured to the outer surface of the side wall 43 of the drum 25 at its lowest point intermediate the manifolds 49, 52. Drain box and dump valve assembly 57 comprises a rectangular side wall 58, a bottom wall 59, and a flexible diaphragm overlaying the bottom wall 59 and defining a cavity 62 with the side wall 43 of the drum 25. A plurality of drain openings 63 are formed in the bottom wall communicating with the cavity 62, as best seen in FIG. 7. The peripheral edges of the diaphragm 60 and the bottom wall 59 are clamped in sealing relationship by a crimped edge 64 of the side wall 58. A drain conduit 65 extends through the bottom wall 59 and the diaphragm 60 communicating with the cavity 62 while a water line 66 extends through the bottom wall 69 communicating with the space between the bottom 69 and the diaphragm 60.

As best seen in FIG. 7, when water under pressure is applied to line 66, diaphragm 60 will be stretched and distorted sealingly to engage the outer surface of the bottom wall 43 thereby closing the drain openings 63, as shown in dashed lines 68. When the water pressure is removed from the line 66, diaphragm 60 will return to its position shown in solid lines in FIG. 7 so that condensed solvent in the drum 25 will drain through the drain openings 63 in side wall 43 into the cavity 62 and thence through the drain conduit 65, as will be hereinafter more fully described. For best drainage, the bottom wall 59 is preferably inclined slightly toward the drain conduit 65, as shown in FIG. 7. Drain conduit 65 is coupled to the still 39, as will be hereinafter more fully described.

Connections 53, 54 are selectively connected to a source of cold water thereby to circulate cold water through the jacket 42 to cool side wall section 43a of drum 25. Connections 55, 56 are at certain times connected to a source of cold water in order to circulate cold water through the jacket 44 so as to cool side wall section 43b, and at other times are selectively connected to a source of hot water thereby to circulate hot water through the jacket 44 to heat the side wall section 43b, as will be hereinafter more fully described. Door 29 is mounted on suitable hinges and when closed actuated a suitable switch 67, as will be hereinafter described. A water pressure-actuated latch 69 is also provided for holding door 29 closed during the cleaning cycle, as will be hereinafter described. Door 29 is provided with a suitable sealing gasket (not shown) for sealingly closing the access opening 27. A suitable pressure and vacuum relief valve 74, which may be of the type shown in FIG. 27 and hereinafter described, is connected to the drum 25 as shown in FIG. 3.

Referring now particularly to FIG. 11, the still 39 comprises a chamber 70 with a cover member 72 defining still cavity 73. The cover member 72 is sealingly joined around its periphery to the side wall 71 of the chamber 70, as by crimping as shown at 76. Drain conduit 65 from the drum drain and dump valve assembly 57 extends through cover member 72 and communicates with the still cavity 73.

A liquid conduit coil 79 is disposed in the still cavity 73 adjacent the bottom wall 78 and has liquid connections 80, 82 respectively extending outwardly through the side wall 71. Connections 80, 82 are at certain times selectively connected to a source of hot water thereby to circulate hot water through the coils 79 so as to heat and vaporize the solvent in the still cavity 73. At other times, connections 80, 82 are connected to a source of cold water thereby to circulate the same through the coils 79, as will be hereinafter described.

A drain and dump valve assembly 83 is provided for the still 39 comprising a generally rectangular side wall 84 secured to the bottom wall 78, as by welding, and bottom plate 85 extending across the wall 84. A flexible diaphragm 88 overlays the bottom plate 85 being sealingly secured to the bottom plate 85 around its periphery by crimping the side wall 84, as shown at 89, diaphragm 88 defining a cavity 86 with the bottom wall 78 of the chamber 70. Bottom wall 78 has drain openings 87 formed therein communicating with the cavity 86. Drain conduit 90 extends through the side wall 84 communicating with the cavity 86. Water line 92 extends through the bottom plate 85 communicating with the space between the bottom plate and the diaphragm 88. When water under pressure is supplied to the water line 92, diaphragm 88 is distorted to engage the bottom wall 78 and sealingly close the drain openings 87, as shown in dashed lines at 93.

A valve 94 is mounted on the side wall 71 of the chamber 70 and actuated by the float 95 thereby to introduce additional solvent into the still cavity 73 from the line 96, as will be hereinafter described. Switch 97 is mounted on side wall 71 and is actuated by float 98 in response to the level of solvent in the still cavity 73, as likewise will hereinafter be described. A flushing manifold ring 99 is positioned in still cavity 73 and is connected to water line 100 for flushing sludge from the still cavity 73, as will be hereinafter described.

Drain conduit 65 which communicates between the drum drain and dump valve assembly 57 and still 37 is also connected to the interior of drum 25 by vapor conduit 102 which extends through the rear wall 103 of drum 25. Solvent vapor generated in still cavity 73 due to heating of the solvent therein by the circulation of hot water through the still coil 79 is introduced into the interior of drum 25 through conduit 102, as will hereinafter be more fully described.

Front wall 34 of the basket 32 is imperforate and has access opening 33 therein. For strength purposes, the rear wall of basket 32 is formed of two sheets 104, 105 of imperforate metal secured to hub 106 which in turn is secured to basket shaft 107. Basket shaft 107 extends through the rear wall 103 of the drum 25 with a running seal 108, to be hereinafter more fully described, being provided. Basket shaft 107 and basket 32 are rotatably journaled in and supported by bearing 109 mounted on support plate 110. Bearing support plate 110 is secured to the frame 26 at the rear of drum 25.

Tumbling ribs 111 and 131 extend transversely between the front wall 34 and the rear walls 104, 105 of basket 32 at their outer periphery and are secured thereto, as by welding, thus spacing and supporting the front wall 34 from the rear walls 104, 105. In the illustrated embodiment, the apertured side wall 33 of the basket 32 is formed of wire mesh screen 112 secured to flange portions 114, 115, 116, 117 on the front and rear basket walls 34, 104, 105. As will be hereinafter more fully described, the pumping blades 38 at times remove condensed solvent from the side wall 43 of drum 25 and circulate the condensed solvent through the materials in the basket 32, and at other times pump heated air from the side wall section 43 through the materials in the basket.

In order to insure that the condensed solvent and heated air thus pumped by the blades 38 are circulated solely through the basket 32, running seals 118 are provided between the front and rear wall flanges 114, 117 of basket 32 and on the front and rear walls 28, 103 of drum 25. Seals 118 respectively comprise annular members 119 respectively having a U-shaped cross-section, and respectively secured, as by welding, to the annular flanges 114, 117 with the outer edges of the wire screen 112 being secured therebetween. Annular sealing rings 120 formed of suitable material, such as nylon, are respectively seated in the annular channel members 119 and are biased outwardly into running sealing engagement with the front and rear walls 28, 103 of drum 25 by suitable springs 122.

Lint tends to accumulate on the inner surface of side wall 43 of drum 25 and in order to remove this lint, a plurality of removable screen sections 123 are provided respectively removably secured by clips 124 mounted on adjacent small tumbling blades 111, as best seen in FIG. 8. Removable screen sections 23 may thus be removed from the interior of basket 32 thus permitting removal of lint from the inner surface of side wall 43 of the drum 25.

Pumping blades 38 are respectively formed of relatively thin sheet metal and are pivotally mounted on side walls 33 of basket 32 by means of suitable hinges 125 secured to the large tumbling blades 125. Inspection of FIG. 10 will reveal that hinges 125 are arranged to accommodate some lateral movement of basket 32 with respect to blades 38. Pumping blades 38 are biased outwardly in the direction shown by the arrow 126 in FIG. 8 into engagement with the inner surface of side wall 43 of drum 25 by means of suitable springs 127. In order to accommodate wear and to enhance removal of condensed solvent and heated air from the inner surface of side wall 43 of drum 25, strips 128 formed of suitable material, such as nylon, are secured to the leading edges of blades 38 and have down-turned and outwardly tapered sides 129, which respectively engage the inner surfaces of front and rear walls 28, 103 of drum 25.

Reference to FIG. 5 will reveal that by virtue of the eccentric rotatable mounting of basket 32 with respect to the major axis 36 of drum 25, when the basket 32 is rotated in the direction shown by the arrow 130 referred to as the "forward" direction, pumping blades 38 will be actuated inwardly and outwardly thereby removing condensed solvent or heated air from the inner surface of side wall 43 of drum 25, as the case may be, and pumping the same through the wire mesh screen 112 into and through the interior of basket 32 and the materials therein. As will be hereinafter described, basket 32 is at times rotated at higher speed in the opposite direction as shown by the arrow 132 in FIG. 5, referred to as the "reverse" direction, in order centrifugally to extract condensed solvent from the materials in the basket.

Basket 32 is rotated in the forward and reverse directions 130, 132 by a conventional reversible motor 133 mounted on frame 26. Motor 133 rotates basket 32 in the forward direction at the lower or slow speed by means of V belt pulley 134 on motor shaft 135 driving pulley 136 on jack shaft 137 by V belt 138. Pulley 139 on jack shaft 137 then drives pulley 140 on basket shaft 107 by V belt 142. Jack shaft 137 is mounted on bearing support plate 110 by means of bracket 143. Motor 133 rotates basket 32 in the reverse direction at high extraction speed by V belt pulley 144 on motor shaft 135 directly driving V belt pulley 145 on basket shaft 107 by V belt 146. Basket drive double clutch coupling assembly 147, to be hereinafter more fully described, couples pulley 140 to basket shaft 107 when motor 133 is energized to rotate in the forward direction, and couples V belt pulley 145 to the shaft 107 when motor 133 is energized to rotate in the reverse direction. Motor 133 also drives circulating pump 148 by means of V belt pulley 149 on motor shaft 135 driving V belt pulley 150 on pump shaft 152 by V belt 153.

The solvent most frequently used in dry cleaning apparatus of the type disclosed is Freon 113 and in the present closed cycle system, it is necessary to provide a running seal between basket shaft 107 and rear wall 103 of drum 25 in order to prevent escape of solvent and vapor. Referring particularly to FIG. 12 in which the running seal 108 is shown in detail, bearing tube 109 is secured, as by welding, to plate 154 which in turn is removably secured to bearing support plate 110 by suitable threaded fasteners 155. A bushing 156 formed of suitable material surrounds shaft 107, being sealed thereto with a suitable sealant compound, and extends from bearing tube 105 through opening 157 in rear wall 103 of the drum 25. Face seal ring 161 formed of suitable metal is pressed into resilient ring 158 formed of suitable material, such as rubber, which in turn is pressed into a square metal plate 159 which is loosely held in place on the outer surface of rear wall 103 by a plurality of sheet metal clips 160 suitably secured to rear wall 103, as by spot welding. A floating support for face seal 157 is thus provided to accommodate any eccentricity in basket shaft 107. A carbon face seal 162 is provided having a running engagement with the metal face seal 161 and supported by a resilient member 163 pressed into angular flange member 164 and mounted on the bushing 156. Coil spring 165 surrounds bushing 156 engaging member 164 and spring seat 166 which in turn engages bearing tube 109, thus resiliently urging the carbon face seal 162 into running sealing engagement with the metal face seal 161.

The inner extremity 167 of basket shaft 107, which extends into the interior of drum 24, is threaded and hub 106 is threaded thereon, as shown, the rear wall members 104, 105 of basket 32 being secured to hub 106 in any suitable fashion, as by welding, as shown. Hub 106 is locked in position by a retainer plate 168 which is secured to the end of the inner extremity 167 of basket shaft 107 by suitable screws 169, basket 32 thus being secured on the threaded shaft extremity 167 against reverse rotation. A protective cap 170 is likewise secured to the inner extremity 167 of the basket shaft 107 by a suitable flat head screw 172.

Referring now to FIGS. 13, 14 and 15, the basket drive double clutch coupling assembly which couples V belt pulley 140 to basket shaft 107 on forward rotation of motor 133 and which couples V belt pulley 145 to the basket shaft 107 on reverse rotation of the motor is shown in greater detail. Bushings 173, 174, respectively having external threads 175, 176, are respectively mounted on bearing sleeves 183, 187, which in turn are rotatably mounted on basket shaft 107. Double faced clutch plate 177 is secured to shaft 107 between the bushings 173, 174 and bearings 183, 187 in any suitable manner, as by a pin 178. V belt pulley 145 is secured to bushing 173. Clutch ring and nut 182 is mounted on bushing 173 by means of internal threads 179 which cooperatively engage bushing threads 175 so that rotation of pulley 145 in the reverse direction rotates threaded bushing 173 and thus moves the clutch ring and nut 182 axially in the direction of the arrow 180 through the cooperation of threads 175, 179.

Pulley 140 is likewise secured to bushing 174. Clutch ring and nut 186 is mounted on bushing 174 by means of internal threads 184 cooperatively engaging bushing threads 176 so that rotation of pulley 140 in the forward direction rotates bushing 174 and thus causes clutch ring and nut 186 to be moved axially, as shown by the arrow 185, through the cooperation of threads 176, 184.

The face of clutch ring 182 which faces toward clutch plate 177 is milled, as at 188, to provide parallel driving dogs 189. The face of clutch ring 186 facing clutch plate 177 is similarly milled to provide driving dogs 190. The opposite faces of clutch plate 177 are milled to provide cooperating driving dogs 192, 193. It will now be seen that when the V belt pulley 140 is rotated in the forward direction by forward rotation of motor 133, clutch ring 186 will be moved axially toward clutch plate 177 in the direction shown by arrow 185 thereby causing the driving dogs 190 in the clutch ring 186 to engage the driving dogs 193 of clutch plate 177, thereby to rotate basket shaft 107 and the basket 32 in the forward direction. Likewise, when the V belt pulley 145 is rotated in the reverse direction by operation of motor 133 in the reverse direction, clutch ring 182 will move axially toward clutch plate 177 in the direction 180, thereby causing driving dogs 189 on clutch ring 188 to engage driving dog 192 on clutch plate 177, thereby driving basket shaft 107 and the basket 32 in the reverse direction. It will be understood that the V belt pulley 140, 145 are both simultaneously driven in the same direction, but at different speeds, by the motor 133. However, when clutch ring 186 is moved in direction 185 thereby to cause engagement with clutch plate 177 due to forward rotation of motor 133, clutch ring 182 is caused to move in the same direction away from clutch plate 177 thereby disengaging from clutch plate 177. Likewise, when V belt pulley 145 is rotated in the reverse direction thereby to cause engagement of clutch ring 182 with clutch plate 177, the clutch ring 186 is moved in the same direction and out of engagement with clutch plate 177.

In order to restrain clutch rings 182, 186 against rotation, suitable hair pin friction drag loops 194 are seated in annular grooves in the outer peripheries of the clutch rings 182, 186 and have straight ends 195, 196 which respectively engage stop members 197, 198 secured to bracket member 199, in turn is secured to the bearing support plate 110.

It will now be seen that when the motor 133 is energized to rotate in the forward direction, basket 32 is rotated at slow speed in the forward direction for washing and drying the materials in the basket 32, whereas when the motor 133 is energized to rotate in the reverse direction, basket 32 is rotated at high speed in the reverse direction thereby centrifugally to extract condensed solvent from the materials in the basket.

Referring now to FIG. 16, cold water is supplied from an external source (not shown) to line 200 and through a conventional strainer 202 to cold water manifold 203. Cold water is selectively supplied to the left drum jacket 42 from manifold 203 by line 204, connection 54 and manifold 49. The cold water return from the left jacket drum 42 is from manifold 48 through connection 53, line 205, valve V-6 and cold water return manifold 206, which is connected to the drain conduit 90. It will thus be seen that when valve V-6 is opened, cold water will flow through the left drum jacket 42. A conventional orifice restriction, shown schematically at 207, is provided in cold water return line 205.

Cold water is selectively provided to the right drum jacket from cold water manifold 203 through line 208, connection 56 and manifold 52. Cold water is returned from the right jacket 44 from manifold 50 through connection 55, line 209, valve V-7 and the cold water return manifold 206. A conventional orifice restriction, shown schematically at 211, is provided in cold water return line 209. It will now be seen that when valve V-7 is opened, cold water will be circulated from the cold water manifold 203 through the right drum jacket 44 and returned to the drain conduit 90.

Water is heated in the hot water heater 40 by means of a conventional immersion heater 210 coupled across supply lines 212, 213 by a conventional thermal switch 214. Supply lines 212, 213 are coupled to a conventional source of single phase alternating current (not shown) such as 240 volts, 60 cycles, by conventional line switch 215. Neutral connection 216 will thus provide one-half the source of voltage, i.e., 120 volts in the illustrated embodiment, with supply lines 212, 213. Switch 214 is employed to control the temperature of the water and heater 40 within desired predetermined limits.

Hot water is selectively supplied to the right drum jacket 44 through hot water manifold 217 which is coupled to the hot water heater 40, connection 56 and manifold 52. Hot water is returned from the right drum jacket 44 from manifold 50, connection 55, hot water return line 218, valve V-2, and hot water return manifold 219, which returns the hot water to the heater 40. It will now be seen that when the circulating pump 140 is operated by motor 133 and the valve V-2 is open, hot water will be circulated from the hot water manifold 217 through the right drum jacket 44.

Hot water is also supplied to the still coil 79 from hot water manifold 217 through connection 82 and is returned from the still coil 79 through connection 88, return line 220, valve V-1 and the hot water return manifold 219. It is thus seen that when circulating pump 148 is operating and valve V-1 is opened, hot water will be circulated from hot water manifold 17 through the still coil 79.

Cold water is selectively supplied to the still coil 79 from the cold water manifold 203 through cold water line 222 and connection 82, and is returned from the still coil 79 through connection 80, line 220, valve V-4 and the cold water return manifold 206. A conventional orifice restriction, shown schematically at 223, is connected in line 220 adjacent valve V-4 for suitably reducing the line pressure of the cold water. It will thus be seen that when valve V-4 is opened, cold water will be circulated from the cold water manifold 203 through the still coil 79.

Cold water is supplied to the drum dump valve 57 from cold water manifold 203 through line 224, line 225 and connection 66, a conventional small bleed orifice, shown schematically at 226, being provided in line 224. Thus, cold water under pressure is normally admitted to the drum dump valve 57 thereby causing the diaphragm 62 to close drain opening 66 in side wall 43 of drum 25, thereby preventing drainage of the condensed solvent from the interior of the drum. Drum dump valve 57 is opened by valve V-5 which connects line 225 to the cold water return manifold 206. It will thus be seen that when valve V-5 is opened, the cold water in line 224 will be bypassed directly through valve V-5 relieving the pressure applied to the diaphragm 60, thus permitting it to return to its undistorted position as shown in FIG. 7, thereby to open drain openings 63 so that liquid solvent in the drum 25 will be drained to the drain line 65.

Cold water is supplied to the still dump valve 83 from cold water manifold 203 through line 227, line 228 and connection 92, another bleed orifice, shown schematically at 229, being provided in line 227. Thus, water under pressure is normally applied to the still dump valve 83 thus causing the diaphragm 88 to close drain openings 87 thereby to prevent drainage of liquid in the still 37 into the drain line 90. Still dump valve 83 is operated by valve V-3 which couples line 228 to the cold water return manifold 206. It will thus be seen that when valve V-3 is opened, the cold water in line 227 will be bypassed by the valve V-3 to drain 90, thus relieving the pressure on diaphragm 88 permitting it to return to its position as shown in FIG. 11 thereby opening the drain openings 87 to permit liquid in the still to drain into the drain line 90.

Cold water under pressure is supplied to the door latch 69 from cold water manifold 203 through line 230, valve V-9, and line 233. Thus, when valve V-9 is opened, door latch 69 is actuated to keep door 29 closed. Door latch 69 is released by spill valve V-10 which couples line 233 to the cold water return manifold 206.

Additional solvent is supplied to still 37 from solvent supply bag 235 through line 236, valve V-12, line 238, connection 96 and float-actuated valve 94. Detergent is introduced into the drum 25 from detergent supply bag 239 through line 240, valve V-11 and line 243.

Valves V-1 through V-12 are actuated in the predetermined desired sequence, to be hereinafter more fully described, by a suitable timing motor 244 coupled to the valves V-1 through V-12, as indicated schematically by dashed line 242. It will be readily understood that the valves V-1 through V-12 may be solenoid-operated valves energized in the proper sequence by cam-actuated contacts operated by timing motor 244, or in the alternative, valves V-1 through V-12 may be directly actuated by suitable cams operated by the timing motor 244.

A manually-actuated momentary starting switch 245 couples supply line 213 to line 246 which is connected to one terminal 247 of the timing motor 244. The other terminal 248 is connected by line 249 and door hinge switch 68 to the neutral supply line 216. Four cam-actuated contacts SW-1 through SW-4 are operated in the proper sequence by the timing motor 244. Cam-actuated contact SW-1 is opened at the end of one cycle of operation and is closed by timing motor 244 immediately after it is initially started by manually actuated switch 245. Cam-actuated switch SW-1 with thermal switch 250 coupled in series therewith connects supply line 213 to line 246 and timing motor terminal 247. It will thus be seen that with the door 29 closed and the contacts of door hinge switch 68 thus closed, momentary closing of the starting switch 245 will energize timing motor 244 causing cam-actuated switch SW-1 to close. If the water in the water heater 40 is at the proper predetermined temperature as sensed by the thermal switch 250, closing of cam-actuated switch SW-1 will maintain the timing motor 244 in the energized condition until the end of the cycle when switch SW-1 is again opened. If the temperature in the water heater 40 has not reached the proper level, release of the manual start switch 245 will de-energize the timing motor 244, however, as soon as the water reaches the appropriate temperature thereby closing the thermal switch 250, the motor will then be energized through the cam-actuated switch SW-1.

Cam-actuated switch SW-2 connects the drive motor 33 for energization across supply lines 212, 213. Cam-actuated switch SW-3 is coupled to reverse the direction of rotation of the drive motor 33 at the appropriate time as will be hereinafter described.

As will hereinafter be described, cam-actuated switch SW-1 is opened a predetermined period of time prior to the end of the cycle temporarily to de-energize the timing motor 244 to permit condensed solvent to be returned to the still 37. When the solvent in the still reaches the desired level, switch 97 is actuated thereby coupling supply line 213 to timing motor line 246 and terminal 247 through cam-actuated delay switch SW-4. Delay switch SW-4 is employed to disconnect the float switch 97 after the timing motor 244 has been restarted and is again energized through switch SW-1.

Referring briefly to FIG. 18, there is shown a fitting 252 suitable for use with appropriate large or small bored holes as the orifice restrictions 207, 211, 223, 226 and 229 above-described.

Referring now to FIGS. 22 and 23, in the preferred form of the embodiment above-described, two smooth runner-strips 320 are secured to the inner surface of side 43a of drum 25a, respectively adjacent the front and back sides 28, 103. Each of the strips 320 has a tapered top end 321 secured to the inner surface of the drum adjacent the top center of the inside diameter, as by welding, end 321 being tapered smoothly to merge with the inner surface of the drum, as shown. Each of the runner strips 320 has its other end 322 secured a short distance beyond the bottom center of the inside diameter of the drum, as by welding, the ends 322 likewise being tapered smoothly to merge with the inner surface of the drum. Runner strips 320 are spaced a small distance away from the inner surface of drums 43a by a plurality of pads 323 of insulating material, such as rubber or nylon, attached in any suitable manner, as by cement. Runner strips 320 function during the drying cycle to prevent the blades 38 from contacting the cooled inner surface of the drum side wall section 43a and picking up the condensed solvent therefrom which would then be carried by the blades 38 over onto the heated inner surface of the side wall section 43b and revaporized.

It will readily be seen that during the initial portion of the cycle during which solvent is vaporized in the still, introduced into the drum 25, and condensed therein with both side walls cooled by circulation of cold water through the jackets 42, 44, the solvent vapor which condenses on the inner surface of the side wall section 43a will run downwardly to the bottom of the drum where it collects in a pool and is then conveyed by the blades 38 upwardly and ultimately introduced into the basket 32.

Referring now to FIGS. 24 and 25, when the raised runner strips 320 are employed, it is desirable to lock the blades 38 against the outer surface of the basket 32 during the reversed high speed rotation of the basket. To accomplish this locking, a blade lock bar 324 extends transversely through and across each tumbling rib 111 which is intermediate the ends of a respective blade 38. Each of the blade lock bars has an end portion 325 and an elongated eccentric center portion 326. Ends 325 of the blade lock bars are respectively journaled in suitable bearings 327 in the end walls 34 and 104, 105 of the basket 32. A leaf spring member 328 is secured to the end portion 325 of the plate lock bar 324 which projects beyond side wall 34 of basket 32 toward the front side wall 28 of the drum 25 by means of collar 329. The outer end of the leaf spring member 328 carries a friction button 330 which is biased by the spring 328 against the inner surface of the front drum wall 28.

Each of the blades 38 is provided with a pair of blade latch hook members 332 which respectively extend downwardly into the respective tumbling ribs 111 when the blades 38 are adjacent the basket 32. Blade latch hook members 332 respectively have notches 333 formed therein which are engaged by the eccentric portions 326 of the blade lock bars 324 during reverse rotation of the basket.

It will be seen that during forward rotation of the basket 32, the friction buttons 330 by dragging on the inner surface of the front wall 28 of the drum 25 rotate the blade lock bars 324 so that the eccentric portions 326 are rotated to the positions shown in dashed lines 334 in FIG. 24 thereby permitting the blades 38 to be biased outwardly to their scooping and pumping positions by the springs 125. When rotation of the basket is reversed, the friction buttons 330 cause the blade lock bars 324 to rotate so that the eccentric portions 326 are in the position shown in solid lines in FIG. 24 and as the blades 38 are momentarily moved inwardly in passing over top center in rotation of the basket 32, the notch 333 engages the eccentric portions 326. As the reverse high speed rotation of the basket 32 continues, the friction buttons 330 maintain the eccentric portions 326 in their latching positions as shown in solid lines in FIG. 24 thereby locking the blades 38 inwardly close to the outer surface of the basket 32 during the high speed reverse extracting rotation of the basket.

Operation

Referring additionally to FIG. 17, with line switch 215 closed for a sufficient length of time to heat the hot water in the heater 40 to the desired temperature as sensed by the thermal switch 250, with the materials to be cleaned deposited in the basket 32 through the access openings 27, 33 and with the door 29 closed, thus closing door hinge switch contacts 68, momentary actuation of manual start switch 245 will energize timing motor 244 resulting in the immediate closing of cam-actuated switch SW–1, as shown at 253 in FIG. 17A. Valve V–9 which was closed at the beginning of the cycle is immediately opened, as shown in FIG. 17M, thereby actuating the door latch 69 to hold the door 29 closed. Valve V–11 is opened for interval 255 as shown in FIG. 17O thereby to introduce detergent into the interior of drum 25 and valve V–12 is opened for interval 256 thereby to add additional solvent to the still 37 as called for by the float valve 94. Valve V–6 is immediately opened, as shown at 257 in FIG. 17J and valve V–7 is likewise immediately opened, as shown at 258 in FIG. 17K, thereby causing cold water to circulate through the left and right drum jackets 42, 44 to cool the interior surfaces of the left and right sections 43a and 43b of the side wall of the drum 25. Immediately thereafter, cam-actuated switch SW–2 is closed thereby to energize the main drive motor 33 in the forward direction, as shown at 259 in FIG. 17C, and valve V–1 is opened thereby to circulate hot water through the still coils 79 as shown at 260 in FIG. 17E.

The hot water circulating through the still coils 79 heats and vaporizes the solvent in the still 37, the resulting solvent vapor entering the interior of drum 25 through line 65 and solvent vapor line 102. The solvent vapor which enters the interior of drum 25 is condensed on the cold sections 43a, 43b of the side wall. Basket 32 is being rotated in the forward direction as shown by the arrow 130 with the result that the pumping blades 38 remove the condensed solvent from the cool side wall section 43b together with the pool of condensed solvent in bottom of drum 25 drained down from wall section 43a and pump it through the aperture side wall 33 of the basket 32 into the materials therein, pumping blades 38 continuing to circulate the condensed solvent through the basket and the materials therein after the solvent in the still 37 has been completely evaporated into the drum 25. In the specific embodiment, the basket 32 is rotated in the forward direction at a speed of approximately 45 r.p.m.

In a specific embodiment, the still 37 contains 2 to 3 gallons of solvent which will be entirely vaporized in the drum 25 in between 2 and 3 minutes. After the solvent has been completely vaporized into the drum 25, valve V–5 is opened for a brief interval, as shown at 262 in FIG. 17I thereby to open the drum dump valve 57 to drain the dirty solvent back into the still 37 through the drain line 65. The drum dump valve 57 is then closed again and the solvent thus returned to the still is again vaporized back into the drum 25. In the illustrated embodiment, washing of the materials in the solvent condensed in the drum 25 continues for 5½ minutes.

At the end of 5½ minutes, valve V–1 is closed thus terminating the circulation of hot water through the still coils 79 as shown at 263 in FIG. 17E. Valve V–4 is opened at this point thus circulating cold water through the still coil 79 as shown at 264 in FIG. 17H. Valve V–3 is also opened, as shown at 265 in FIG. 17G, thereby to open the still dump valve 83, and valve V–8 is opened as shown at 266 in FIG. 17L, thereby to introduce flushing water to the still 37 to flush the accumulated sludge into the drain conduit 90. At the end of the flushing interval 265, 266, valve V–7 is closed, as shown at 267 in FIG. 17K, thereby to terminate the flow of cold water through the right drum jacket 44.

When a washing cycle is completed after 6½ minutes, the valve V–5 is again opened, as shown at 268 in FIG. 17I, thereby opening the drum dump valve 57 to drain the solvent back into the still 37. It will be observed that flow of hot water through the still coil 79 had been terminated one minute earlier by closing valve V–1, as shown at 263 in FIG. 17E, and the flow of cold water through the still coil 79 had been initiated at the same time by opening valve V–4 as shown at 264 in FIG. 17H, and thus, by the time the valve V–5 is opened one minute later to open the drum dump valve and drain the solvent into the still, the still coil 79 is cooled so that the solvent which drains into the still is not vaporized.

In seven minutes cam-actuated switch SW–2 is momentarily opened as shown at 269 in FIG. 17C thereby momentarily deenergizing drive motor 233 and while switch SW–2 is opened, reversing switch SW–3 is actuated as shown at 270 in FIG. 17D. Thus, when switch SW–2 is again closed, motor 233 will be reversed thereby to rotate the basket 32 in the reverse direction at the high extracting speed, as above-described, thus centrifugally extracting the condensed solvent in the materials contained in the basket 32 which drains into the still 37 through the now opened drum dump valve 57, which was opened at 268 in FIG. 17I. High speed extraction continues for approximately two minutes at which time switch SW–2 is again opened, as shown at 272 in FIG. 17C with reversing switch SW–3 being actuated while switch SW–2 is opened, as shown at 273 in FIG. 17D. Thus, when switch SW–2 is again closed, drive motor 33 is again energized to rotate in the forward direction thereby rotating basket 32 at slow speed in the forward direction 130.

At this point, valve V–2 is opened, as shown at 274 in FIG. 17F, thereby circulating hot water through the right drum jacket 44, it being observed that cold water is still being circulated through the left drum jacket 42 as shown in FIG. 17J. The warm air resulting from heating of the inner surface of the right section 43b of the side wall of the drum 25 is thus pumped into the basket 32 and through the materials therein by the pumping blades 38 thereby to vaporize the solvent which remains on the materials. This solvent vapor-laden heated air then impinges on the cooled inner surface of the left section 43a of the side wall of the drum 25 with the result that the solvent vapor is again condensed and drains back into the still 37 through the opened drum dump valve 57. The length of time which is required to thus dry the materials in the basket 32 depends on the nature and quantity of the materials in the basket, and completion of the drying operation is detected by raising of the level of the returned solvent in the still 37 as sensed by the switch 97.

Cam-actuated delay switch SW–4 is closed at eleven minutes as shown at 275 in FIG. 17B, closing at this time of switch SW–4 having no effect since the contacts of the float switch 97, which is coupled in series with switch SW–4, will at this point still be opened. Cam-actuated switch SW–1 is opened at twelve minutes, as shown at 276 in FIG. 17A, thus stopping the timing motor 244 since the contacts on the float switch 97 are still opened. After the materials in the basket 32 have been completely dried at which time the level of the condensed solvent in the still 37 will have reached the predetermined level, which may occupy anywhere from one to ten additional minutes, the contacts of float switch 97 will be closed thus again energizing the timing motor 244 through delay switch contacts SW–4, as shown in dashed lines at 277 in FIG. 17B. Re-energization of timing motor 244 through contacts 97 and delay switch SW–4 immediately recloses switch SW–1, as shown at 278 in FIG. 17A, and drying continues for an additional three minutes to insure that the materials in the basket 32 are completely dried. Delay switch SW–4 is opened one minute after resumption of operation of timing motor 244, as shown at 279 in FIG. 17B, so that opening of switch SW–1 at the end of the cycle will result in de-energization of the timing motor 244.

At the concdlusion of the final three minute interval as shown at 280 in FIG. 17A, switch SW–1 is opened thereby to terminate energization of the timing motor 244, as shown at 282. At the same time, switch SW–2 is opened thereby to de-energize the drive motor 33 to stop rotation of the basket 32, as shown at 283 in FIG. 17C. Valve V–2 is closed, as shown at 284 in FIG. 17E, thereby to terminate the flow of hot water through the right drum jacket 44 and valve V–4 is closed as shown at 285 in FIG. 17H thereby to terminate the flow of cold water through the still coils 79. Valve V–5 is closed, as shown at 286 in FIG. 17I thereby to close the drum dump valve 57 and valve V–6 is closed, as shown at 287 in FIG. 17J, thereby to terminate the flow of cold water through the left drum jacket 42. Finally, valve V–9 is closed, as shown at 288 in FIG. 17M, and valve V–10 is opened as shown at 289, thereby to release the door latch 69 so as to permit opening of the door 29 to remove the cleaned materials from the basket 32.

In a specific embodiment of the invention, drum 25 has an inside diameter of 32″ and an inside depth of 17″, and basket 32 has an inside diameter of 25″ and an inside depth of 15″. The chamber 71 of still 39 has an inside diameter of about 20″ and an inside depth of 3¾″ and will thus accommodate the charge 2½ gallons of Freon 113 employed in this specific embodiment. In the specific embodiment, motor 113 was ½ h.p. with the forward washing and drying basket speed being 45 r.p.m. and the reverse extraction speed being 230 r.p.m. Heater 40 provides hot water at 180° F., immersion heater 210 providing an input of 4500 watts, and it has been found that circulation by the pump 148 of three gallons per minute of such hot water provides sufficient heat input into the still coil completely to vaporize the 2½ gallons charge of solvent into the drum 25 in approximately two minutes. It has been found that the above-described specific embodiment will completely clean and dry an eight-pound load of clothes in fifteen to twenty-five minutes with a loss of only 50 grams or less of solvent.

In the above-described specific embodiment, with hot water at 180° F. supplied to the still, the heat balance is such that a solvent vapor pressure of approximately 10 pounds per square inch will build up during distillation of the solvent from the still into the drum and transfer of the solvent from the still to the drum and condensation of the solvent vapor therein will be accomplished in approximately 2 minutees, as indicated. Pressure relief valve 74 is thus set to relieve an internal vapor pressure in the drum slightly in excess of 10 pounds per square inch. Reference to the vapor pressure curve for Freon 113 indicates that at a pressure of 10 pounds per square inch, the boiling point is in the neighborhood of 150° F. Thus, in this embodiment, condensation in the drum 25 is accomplished by pressure, the thermal mass of the entire apparatus including the basket and the load therein and the cold water in the cooling jackets rapidly providing complete condensation.

The vacuum relief portion of valve 74 is provided to relieve vacuum in the drum 25 at any time the internal pressure drops below atmospheric pressure in order to permit opening of the door 29 and to protect against collapse of the drum. The pressure and vacuum relief valve 74 may be connected to the still 39, however it is preferably connected to the drum 25 as shown in order to isolate it against any transient high pressures which may develop in the still.

Referring now to FIGS. 19, 20 and 21, another embodiment of the invention is shown in which the solvent vapor removed from the materials in the basket during the drying cycle is condensed in the still rather than on the drum wall. Here, with like elements being indicated by like reference numerals, drum 29 is generally elliptical in cross-section, with basket 32 being mounted for rotation on the major axis 292 of drum 290, the elliptical side wall 293 of drum 290 thus providing the variable spacing with the apertured side wall 33 of basket 32 to impart the pumping action to the pumping blades 38.

In this embodiment, a single fluid jacket 294 embraces the outer surface of side wall 293 of drum 290 with its passages 295 being connected by transverse manifolds 296, 297. Drain openings 298 are formed in side wall 293 of drum 290 at its lowest point between the manifolds 296, 297 and communicating with drain manifold 299.

Still and condensor 300 is disposed adjacent the rear wall 302 of drum 290, rear wall 302 forming a part of the wall of the still and condensor 300. Openings 303 and 304 in the rear wall 302 communicate between the interior of drum 290 and the still cavity 305. Drain manifold 299 likewise communicates with the still cavity 305 and a drain conduit communicates with cavity 305 at its lowest point.

Openings 303, 304 are selectively opened and closed by valves 307, 308 selectively actuated by solenoids 309, 310. Drain manifold 299 is selectively opened and closed by valve 312 actuated by solenoid 313. Drain conduit 306 is selectively opened and closed by valve 314 actuated by solenoid 315. Liquid conduit coil 316 is disposed in the still cavity 305.

In the operation of the embodiment of FIGS. 19, 20 and 21, with liquid solvent in still cavity 305, hot water circulated through the still coil 316, cold water circulated through the drum jacket 294, valves 308, 312 and 314 closed and valve 307 open, the solvent is vaporized and enters the drum through opening 303 being condensed upon the cooled inner surface of the side wall 293 of drum 290 and removed therefrom and pumped through the perforated side wall 33 into the basket 32 and the materials therein by the pumping blades 38.

During the washing cycle and while the still is empty, valve 307 is closed, flushing water is introduced into the still cavity 305 by line 317, and the valve 317 is opened thereby to flush the sludge out of the drain conduit 306.

At the end of the washing cycle with the cold water now being circulated through the still coil 316, and with valve 307 reopened to provide a vent, valve 312 is opened thereby to permit the condensed solvent to drain back into the still cavity 305. The rotational speed of basket 32 is then increased, either in the reverse direction as in the case of the previous embodiment, or still in the forward direction, thereby centrifugally to extract condensed solvent from the materials in the basket 32.

During the drying cycle, valve 312 is closed, both valves 307 and 308 are opened and hot water is circulated through the drum jacket 294. The pumping blades 38 thus remove hot air from the inner surface of side wall 293 of the drum 290, circulate it through the basket 32 and the materials therein, and through still cavity 305, the solvent vapor-laden air entering the still cavity 305 through the open valve 307 and the opening 303 with the vapor then being condensed in still cavity 305 by reason of the circulation of cold water through the still coil 316.

It will be readily understood that the valve actuating solenoids 309, 310, 313 and 315 will be actuated in the desired predetermined sequence to provide a complete cycle of operation by a suitable programming system, as in the case of the previous embodiment.

Referring now to FIG. 26 of the drawings, in the preferred form of the embodiment of FIG. 1, the plumbing and valving connections have been simplified by employing three-way valves in lieu of certain of the valves shown in FIG. 16. Here, with the like elements being indicated by the like reference numerals, the drum dump valve 57 is selectively connected to the cold water manifold 203 or the drain 90 by three-way valve 335 and the still dump valve 83 is likewise selectively connected to the cold water manifold 203 and in the drain 90 by three-way valve 336. The still flush nozzle 99 is again selectively connected to cold water manifold 203 by valve V–3, however, both the drum latch cylinder 69 and the left drum jacket 42 are selectively connected to the cold water manifold 203 by valve 337.

One side of the right drum jacket 44 is selectively connected to the hot water manifold 217 and the cold water manifold 203 by three-way valve 338 and one side of the still coil 79 is likewise selectively connected to the hot water manifold 217 and cold water manifold 203 by three-way valve 339. The other side of the right drum jacket 44 is selectively connected to the hot water return manifold 219 and to the drain 90 by three-way valve 340 and the other side of the still coil 79 is likewise selectively connected to the hot water return manifold 219 and the drain 90 by three-way valve 342. A suitable orifice restriction 343 is provided in the line coupling three-way valves 340, 342 to drain 90.

As indicated heretofore, the embodiment of FIGS. 1 through 17 operates with an internal solvent vapor pressure on the order of 10 pounds per square inch, thus necessitating relatively heavy containment and accompanying weight and expense for the high pressure. It is desirable to provide an embodiment of the apparatus of the invention suitable for home use and in which a considerable lower vapor pressure is employed in order to reduce the weight and expense of the drum. However, if the apparatus is arranged to operate at an internal solvent vapor pressure substantially less than 10 pounds per square inch, the length of time required to transfer the solvent from the still to the drum and to complete condensation of the solvent therein is unduly long. Referring now to FIG. 27, there is shown a modification of the embodiments of FIGS. 1 through 17 incorporating an external condenser 346 which permits operation of the apparatus at an internal solvent vapor pressure limited to 1.0 pounds per square inch with rapid transfer of the solvent from the still to the drum. Here, with like elements being indicated by like reference numerals, the solvent conduit 102 is divided into first and second sections 102–1 and 102–2 with the condenser 346 connected therebetween, as shown. Condenser 346, which may be of any conventional type, includes a coil 347 having its inlet and outlet ends 348, 349 connected in parallel with the water connections 55, 56 to the right drum jacket 44.

The pressure and vacuum relief valve 74 is shown as being connected to the rear wall 103 of the drum 25 by connections 352, the pressure relief portion being spring loaded in conventional fashion as at 353 and the vacuum relief portion incorporating a conventional weight-loaded swing-check valve 354, as shown.

The provision of the external condenser 346 permits rapid extraction of heat from the solvent vapor so that the vapor is condensed as rapidly as it is generated thereby. Limiting buildup of internal vapor pressure in the drum 25. Thus, the pressure and vacuum relief valve 74 may be set to relieve a much lower internal pressure, i.e., on the order of 1.0 pound per square inch.

Referring now to FIG. 28, it may in certain instances be desirable to provide means for relieving a transient high vapor pressure in the still 39 in the event that the vaporization rate temporarily exceeds the condensation rate. For this purpose, a conduit 77 extends downwardly from the cover member 72 toward the bottom wall 78, conduit 77 being connected by an upwardly extending conduit 357 to an elevated container 356. With this arrangement, whenever the vaporization rate temporarily exceeds the condensation rate, a net pressure buildup occurs which forces the liquid solvent from the still cavity upwardly to the conduits 77, 357 into the container 356. As soon as the pressure is relieved, the solvent drains back into the still cavity from the container 356 to maintain the static head.

The dry cleaning apparatus of the invention provides extremely good washing action by reason of the fact that solvent is pumped through the load at a relatively high rate, and further provides excellent drying action by reason of the fact that heated air is also pumped through the load at a relatively high rate. In specific embodiments, solvent is pumped through a load at a rate of 50 to 75 gallons per minute and heated air is pumped through the load at a rate of approximately 100 cubic feet per minute. Furthermore, in the high pressure embodiment of FIGS. 1 through 17 in which solvent vapor is introduced directly into the drum and condensed therein, a part of the vapor permeates the materials in the basket and is condensed directly therein thereby further contributing to the cleaning action. By reason of the highly efficient washing action and drying action provided by the apparatus of the invention, the system employs a much smaller quantity of solvent than prior dry cleaning systems and there is accordingly an accompanying reduction not only in the cost of the solvent, but also in the heating and cooling requirements of the system.

While there have been described above the principles of this invention in connection with specific apparatus, it is to be clearly understood that this description is made only by way of example and not as a limitation to the scope of this invention.

What is claimed is:

1. Closed cycle dry cleaning apparatus comprising: a housing having an access opening therein and means for selectively closing and sealing said opening; an apertured basket rotatably mounted in said housing and having an access opening therein whereby materials to be cleaned may be placed in said basket through said access openings; means for selectively rotating said basket; a solvent still having means for selectively heating the solvent therein thereby to vaporize the same, passage means communicating between said still and said housing for transferring solvent thereto; means for condensing the solvent vapor; means for selectively heating the air in said housing; and pumping means carried by said basket in said housing and actuated thereby for at times circulating condensed solvent through the materials in said basket thereby to wash the same and for at other times circulating heated air through said materials thereby vaporizing the condensed solvent in said materials to dry the same.

2. The apparatus of claim 1 wherein said heating means comprises means for selectively heating at least a part of the wall of said housing.

3. The apparatus of claim 1 further comprising means for selectively cooling at least a part of the wall of said housing.

4. The apparatus of claim 1 wherein said solvent is introduced to said housing in vapor form, and wherein said condensing means comprises means for selectively cooling at least a part of the wall of said housing thereby to condense the solvent vapor therein for washing the materials in said basket.

5. The apparatus of claim 1 wherein said solvent is introduced to said housing in condensed form, and wherein said passage means includes said condensing means.

6. The apparatus of claim 1 further comprising means connected to said housing for relieving a predetermined solvent vapor pressure therein.

7. The apparatus of claim 1 further comprising means for selectively cooling said still.

8. The apparatus of claim 1 further comprising a drain line communicating between said housing and said still and having selectively actuable valve means therein for defining condensed solvent from said housing to said still.

9. The apparatus of claim 8 wherein said drain line includes a chamber on the bottom of said housing, said housing having at least one aperture communicating with said chamber for draining condensed solvent thereto, and a drain conduit coupling said chamber and still, and wherein said valve means includes a flexible diaphragm extending across said chamber and dividing the same into upper and lower sections, said housing aperture and drain conduit communicating with said upper section, and means for selectively admitting fluid under pressure to said lower section thereby causing said diaphragm sealingly to close said housing aperture.

10. The apparatus of claim 1 further comprising means for flushing sludge from said still.

11. The apparatus of claim 1 wherein said pumping means comprises a plurality of pumping blades mounted on said basket and respectively engaging a wall of said housing.

12. The apparatus of claim 1 wherein said housing has a generally arcuate side wall, wherein said basket is generally cylindrical with its side wall apertured, said basket and housing side walls respectively facing with a spacing therebetween which is variable around said basket, and wherein said pumping means comprises a plurality of pumping blades mounted on said basket side wall and respectively engaging said housing side wall for respectively forcing said condensed solvent and heated air into said basket and the materials therein through said apertured side wall in response to said variable side wall spacing.

13. The apparatus of claim 12 wherein said housing is generally cylindrical, said basket being mounted for rotation about its axis, the axis of said basket being eccentric with respect to the axis of said housing thereby providing said variable side wall spacing.

14. The apparatus of claim 12 wherein said housing is generally elliptical, said basket being mounted for rotation about its axis, the axis of said basket being substantially concentric with the major axis of said housing thereby providing said variable wall spacing.

15. The apparatus of claim 12 wherein said blades are pivotally mounted on said basket, and further comprising spring means for biasing said blades outwardly into engagement with said housing wall.

16. The apparatus of claim 12 wherein said housing has spaced parallel front and rear walls, said basket having spaced parallel front and rear walls, said housing and basket front and rear walls being respectively closely spaced, said basket rear wall being rotatably mounted on and supported by said housing rear wall, said blades extending transversely between said housing side walls, and further comprising means for providing a running seal between said housing and basket front and rear walls, respectively, whereby condensed solvent and heated air pumped by said blades are forced into said basket through said side wall apertures.

17. The apparatus of claim 1 wherein said basket rotating means includes means for selectively rotating said basket at a first predetermined speed for washing said materials in said condensed solvent, and at a higher predetermined speed for extracting solvent from said materials.

18. The apparatus of claim 3 wherein said housing has a generally arcuate side wall, and wherein said cooling means includes a cooling fluid jacket on at least a part of said side wall.

19. The apparatus of claim 1 wherein said housing has a generally arcuate side wall, wherein said basket is generally cylindrical with its side wall apertured, said basket and housing side walls respectively facing with a spacing therebetween which is variable around said basket, and further comprising means for selectively cooling at least a part of said housing side wall, said heating means comprising means for selectively heating at least a part of said housing side wall, a plurality of pumping blades mounted on said basket side wall and respectively engaging said housing side wall, said basket rotating means being selectively reversible, said rotating means rotating said basket in one direction at a first predetermined speed whereby said blades force condensed solvent into said basket and the materials therein through said apertured side wall in response to said variable side wall spacing thereby washing said materials in said condensed solvent when said housing side wall is cooled, said blades pumping warm air from said housing side wall into said basket and materials therein through said apertured side wall when said housing side wall is heated, said rotating means rotating said basket in opposite directions at a higher predetermined speed thereby to extract condensed solvent from said materials.

20. The apparatus of claim 19 further comprising first and second fluid conducting jackets respectively on opposite sides of said housing side wall, wherein said cooling means includes means for selectively admitting cooling fluid to said first and second jackets, and wherein said heating means includes means for selectively admitting heating fluid to said second jacket.

21. The apparatus of claim 19 further comprising fluid conducting jacket means on at least a part of said housing side wall, wherein said cooling means includes means for selectively admitting cooling fluid to said jacket means, and wherein said heating means includes means for selectively admitting heating fluid to said jacket means.

22. The apparatus of claim 20 further comprising means on the inner surface of a portion of said housing side wall generally coextensive with said first jacket for spacing the ends of said blades from said side wall portion.

23. The apparatus of claim 19 wherein said solvent is introduced to said housing in condensed form, and further comprising a solvent condenser connected in said solvent passage external to said housing, and means for selectively admitting cooling fluid to said condenser.

24. The apparatus of claim 19 further comprising means for latching said blades inwardly in a position adjacent said basket side wall during said rotating of said basket in said opposite direction.

25. The apparatus of claim 1 wherein said still includes a chamber, and further comprising a fluid conduit in said chamber, said still heating means including means for selectively admitting heating fluid to said conduit, means for selectively admitting cooling fluid to said conduit, a drain connected to said chamber and having selectively actuable valve means therein, means for selectively introducing a flushing liquid to said chamber thereby to flush sludge therefrom.

26. The apparatus of claim 25 further comprising pressure relief means for relieving a predetermined solvent vapor pressure in said chamber.

27. The apparatus of claim 25 wherein said drain includes a second chamber on the bottom of said first-named chamber, said first chamber having at least one aperture communicating with said second chamber for draining sludge and flushing liquid therefrom, and a drain conduit coupled to said second chamber, and wherein said valve means includes a flexible diaphragm extending across said second chamber and dividing the same into upper and lower sections, said first chamber aperture and drain conduit communicating with said upper section, and means for selectively admitting fluid under pressure to said lower section thereby causing said diaphragm sealingly to close said first chamber aperture.

28. The apparatus of claim 1 further comprising fluid jacket means on at least a part of the wall of said housing, first means for selectively admitting cooling fluid to said jacket means, thereby to cool at least a part of the wall of said housing, said heating means comprising second means for selectively admitting heating fluid to said jacket means for heating at least a part of the wall of said housing, a drain line communicating between said housing and said still and having first valve means therein for draining condensed solvent from said housing to said still, third means for selectively actuating said first valve means, fluid conduit means in said still, said still heating means comprising fourth means for selectively admitting heating fluid to said conduit means, fifth means for selectively admitting cooling fluid to said conduit means, sixth means for selectively flushing sludge from said still, a drain line communicating with said still and having second valve means therein, seventh means for selectively actuating said second valve means, said basket rotating means including eighth means for selectively reversing the direction of rotation thereof, said basket rotating means including means for rotating said basket in one direction at a first predetermined speed for cleaning said materials in condensed solvent when said housing wall is cooled and for drying said materials when said housing wall is heated, said basket rotating means including means for rotating said basket in the opposite direction at a higher predetermined speed thereby to extract condensed solvent from said materials.

29. The apparatus of claim 28 further comprising a programming means for actuating said first through eighth means in a predetermined sequence thereby to provide a cycle of operations for said apparatus.

30. The apparatus of claim 29 further comprising means for sensing the level of solvent in said still, and means actuated by said programming means at the beginning of a said cycle for adding solvent to said still in response to said sensing means.

31. The apparatus of claim 29 further comprising means actuated by said programming means at the beginning of a said cycle for introducing a predetermined quantity of detergent to said housing.

32. The apparatus of claim 29 further comprising means for sensing the level of solvent in said still, and means coupled to said programming means for disabling the same at a predetermined time in said cycle in response to said sensing means when the solvent in said still is below a predetermined level.

33. The apparatus of claim 29 wherein said housing closing means is a door, and further comprising means coupled to said programming means and actuated thereby for holding said door closed during said cycle thereby preventing opening of the same.

34. The apparatus of claim 1 wherein said passage means comprises first and second spaced passages respectively communicating between said still and said housing, and further comprising first and second valve means for respectively selectively opening and closing said first and second passages, fluid jacket means on said housing wall, said condensing means comprising means for selectively admitting cooling fluid to said jacket means thereby to cool the wall of said housing, said heating means comprising means for selectively admitting heating fluid to said jacket means, drain means communicating between said housing and said still, third valve means in said drain means for selectively opening and closing the same thereby to drain condensed solvent from said housing into said still, fluid conduit means in said still, said still heating means including means for selectively admitting heating fluid to said conduit means, means for selectively admitting cooling fluid to said conduit means, said pumping means circulating condensed solvent through said basket and materials when said wall is cooled and said still heated, said pumping means removing heated air from said wall and circulating the same through said basket and materials therein thereby to vaporize the condensed solvent in said materials, said pumping means circulating the vapor-laden heated air through said first and second passages and said still when said wall is heated and said still cooled whereby said vaporized solvent from said materials is condensed in said still.

References Cited
UNITED STATES PATENTS

| | | | |
|---|---|---|---|
| 1,909,384 | 5/1933 | White | 68—18 |
| 2,101,841 | 12/1937 | Dinley | 68—18 |
| 2,198,412 | 4/1940 | McDonald | 68—18 X |
| 2,243,093 | 5/1941 | Flahive | 68—18 X |
| 2,691,884 | 10/1954 | Walker | 68—139 |

WILLIAM I. PRICE, *Primary Examiner.*